(12) United States Patent
Nystad

(10) Patent No.: US 9,256,466 B2
(45) Date of Patent: Feb. 9, 2016

(54) DATA PROCESSING SYSTEMS

(71) Applicant: ARM Limited, Cambridge (GB)

(72) Inventor: Jorn Nystad, Trondheim (NO)

(73) Assignee: ARM LIMITED, Cambridge (GB)

( * ) Notice: Subject to any disclaimer, the term of this patent is extended or adjusted under 35 U.S.C. 154(b) by 207 days.

(21) Appl. No.: 13/913,334

(22) Filed: Jun. 7, 2013

(65) Prior Publication Data

US 2014/0366033 A1 Dec. 11, 2014

(51) Int. Cl.
*G06F 9/50* (2006.01)
*G06F 9/30* (2006.01)
*G06F 12/02* (2006.01)

(52) U.S. Cl.
CPC .............. *G06F 9/50* (2013.01); *G06F 9/5016* (2013.01); *G06F 12/0284* (2013.01); *G06F 9/30076* (2013.01); *G06F 2209/5018* (2013.01)

(58) Field of Classification Search
CPC .............. G06F 12/0284; G06F 9/5016; G06F 2209/5018; G06F 9/30076
See application file for complete search history.

(56) References Cited

U.S. PATENT DOCUMENTS

| | | | |
|---|---|---|---|
| 5,742,785 A | 4/1998 | Stone | |
| 7,627,723 B1 | 12/2009 | Buck et al. | |
| 8,108,610 B1 | 1/2012 | Glasco et al. | |
| 8,392,669 B1 | 3/2013 | Nyland et al. | |
| 2011/0154000 A1 | 6/2011 | Fryman et al. | |

FOREIGN PATENT DOCUMENTS

WO WO2013100928 A1 7/2013

OTHER PUBLICATIONS

U.S. Appl. No. 13/962,905, filed Aug. 8, 2013.
Combined Search and Examination Report dated Dec. 5, 2014 in GB Patent Application No. GB1410064.8, 5 pages.
International Search Report and Written Opinion dated Feb. 13, 2015 in International Patent Application No. PCT/GB2014/052427, 10 pages.
Ultra III: Implementaing a Scalable Shared-Memory Multiprocessor, The NYU Ultracomputer Project, 28 pages, at least by 1999. Available at: http://www.cs.nyu.edu/cs/projects/ultra/.
Evaluating the NYU Ultracomputer, The NYU Ultracomputer Project, 19 pages, at least by 1999. Available at: http://www.cs.nyu.edu/cs/projects/ultra/.

(Continued)

*Primary Examiner* — Matthew D Salvucci
(74) *Attorney, Agent, or Firm* — Vierra Magen Marcus LLP

(57) ABSTRACT

When an atomic operation is to be executed for a thread group by an execution stage of a data processing system, it is determined whether there is a set of threads for which the atomic operation for the threads accesses the same memory location. If so, the arithmetic operation for the atomic operation is performed for the first thread in the set of threads using an identity value for the arithmetic operation for the atomic operation and the first thread's register value for the atomic operation, and is performed for each other thread in the set of threads using the thread's register value for the atomic operation and the result of the arithmetic operation for the preceding thread in the set of threads, to thereby generate for the final thread in the identified set of threads a combined result of the arithmetic operation for the set of threads.

25 Claims, 12 Drawing Sheets

(56) References Cited

OTHER PUBLICATIONS

Susan R. Dickey and Richard Kenner, A Combining Switch for the NYU Ultracomputer, Courant Institute of Mathematical Sciences, New York University, 37 pages, Jun. 25, 1992, Available at http://citeseerx.ist.psu.edu/viewdoc/summary?doi=10.1.1.45.1778.

Allan Gottlieb and Clyde P. Kruskal, Coordinating parallel processors: a partial unification, Courant Institute of Mathematical Sciences, New York University, 16 pages (6 blanks, 5 of text, 5 of drawings), Sep. 1981, Available at http://archive.org/details/coordinatingpara00gott.

Benedict Gaster, German Andryeyev, Ofer Rosenberg, Aaftab Munshi, and Robert Elliott, Extension to the OenCL Programming Language for Atomic Counters, Version 5, 3 pages, May 26, 2011.

Notice of Allowance dated Mar. 27, 2014 in U.S. Appl. No. 13/962,905, 9 pages.

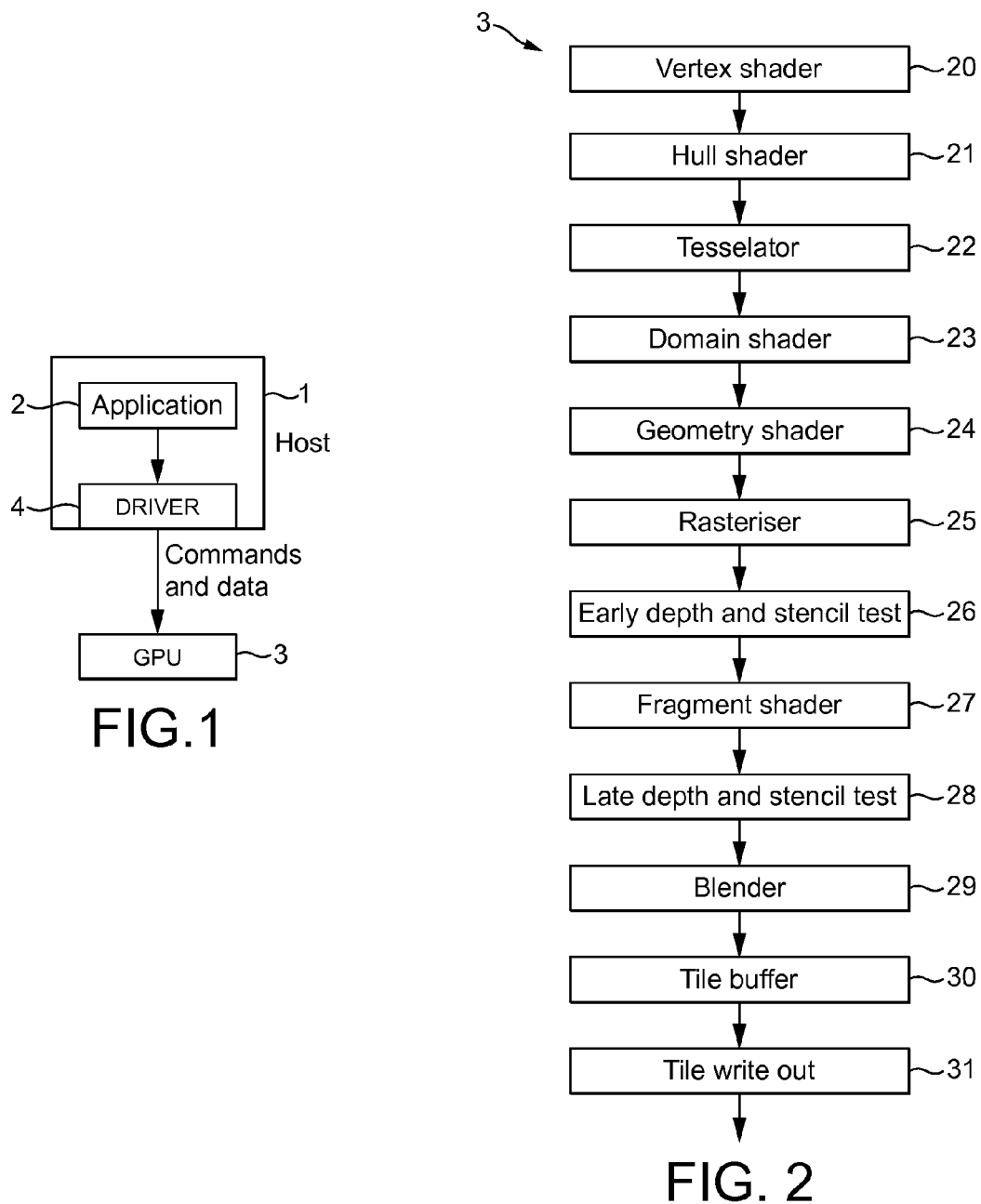

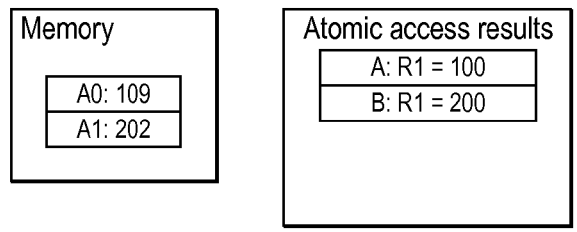
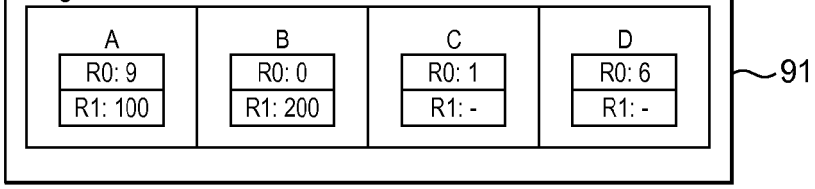
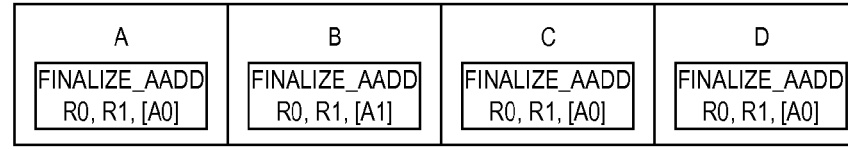
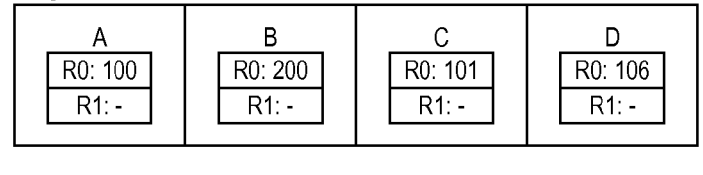
FIG. 7B

Atomic resolution
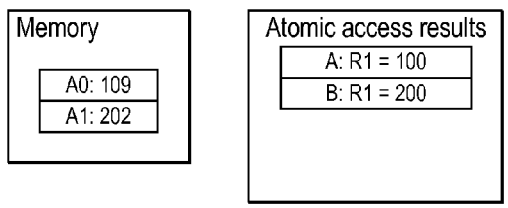
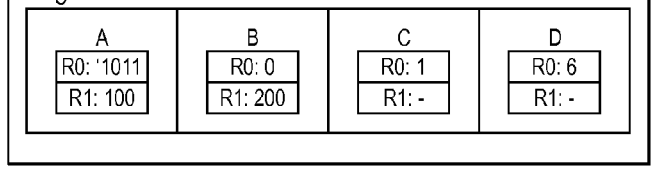
Instruction 2
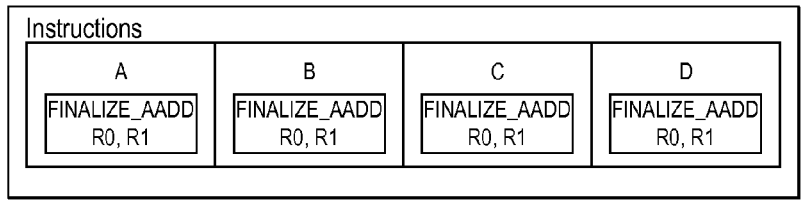
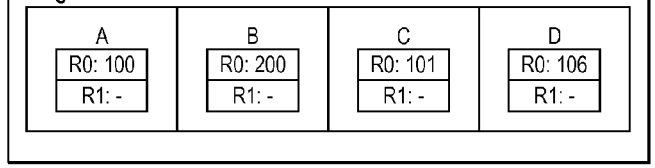
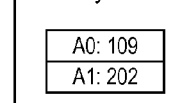
FIG. 9B

DATA PROCESSING SYSTEMS

BACKGROUND

The technology described herein relates to data processing systems, and in particular to the operation of graphics processing systems that include one or more programmable processing stages ("shaders").

As is known in the art, graphics processing is typically carried out in a pipelined fashion, with one or more pipeline stages operating on the data to generate the final render output, e.g. frame that is displayed. Many graphics processing pipelines now include one or more programmable processing stages, commonly referred to as "shaders". For example, a graphics processing pipeline may include one or more of, and typically all of, a geometry shader, a vertex shader and a fragment (pixel) shader. These shaders are programmable processing stages that execute shader programs on input data values to generate a desired set of output data (e.g. appropriately transformed and lit vertex data in the case of a vertex shader) for processing by the rest of the graphics pipeline and/or for output. The shaders of the graphics processing pipeline may share programmable processing circuitry, or they may each be distinct programmable processing units.

A graphics processing unit (GPU) shader core is thus a processing unit that performs graphics processing by running small programs for each graphics item in a graphics output to be generated such as a render target, e.g. frame (an "item" in this regard is usually a vertex or a fragment (pixel)). This generally enables a high degree of parallelism, in that a typical render output, e.g. frame, features a rather large number of vertices and fragments, each of which can be processed independently.

As is known in the art, a shader program to be executed by a given "shader" of a graphics processing pipeline will be provided by the application that requires the graphics processing using a high-level shader programming language, such as GLSL, HLSL, OpenCL, etc. This shader program will consist of "expressions" indicating desired programming steps defined in the relevant language standards (specifications). The high-level shader program is then translated by a shader language compiler to binary code for the target graphics processing pipeline. This binary code will consist of "instructions" which are specified in the instruction set specification for the given target graphics processing pipeline. The compilation process for converting the shader language expressions to binary code instructions may take place via a number of intermediate representations of the program within the compiler, as is known in the art. Thus the program written in the high-level shader language may be translated into a compiler specific intermediate representation (and there may be several successive intermediate representations within the compiler), with the final intermediate representation being translated into the binary code instructions for the target graphics processing pipeline.

A known way to improve shader execution efficiency is to group execution threads (where each thread corresponds to one vertex or one fragment (pixel)) into "groups" or "bundles" of threads, where the threads of one group are run in lockstep, one instruction at a time. This way, it is possible to share instruction fetch and scheduling resources between all the threads in the group. (Other terms used for such thread groups include "warps" and "wavefronts". For convenience the term thread group will be used herein, but this is intended to encompass all equivalent terms and arrangements, unless otherwise indicated.)

It is common in modern graphics processing units to have instructions to perform "atomic" memory operations. An "atomic" memory operation is an operation sequence that reads a memory location, performs an arithmetic operation between the memory value and a register value, and then writes the result of the arithmetic operation back to the same memory location. This sequence of operations is carried out so that to every observer, it looks as if the sequence has either not been performed at all, or been performed in its entirety. It is executed as one indivisible unit, hence the name "atomic".

The arithmetic operation that is performed as part of the atomic is usually a simple operation that is both commutative and associative. Common examples of such operations are: Integer Add; Bitwise AND, OR, XOR; Minimum Value; Maximum Value.

Other atomic operations that are common but not commutative/associative are:

Swap (also known as Exchange)—the register value is written to the memory location and the old value of the memory location is then returned to the shader;

Compare-And-Swap (Compare and Exchange)—two register values are provided, the memory value is compared to the first of them, and if they compare equal, then the second register value is written to the memory location.

Atomic memory operations typically occur in two variants: "Return" and "NoReturn". The "Return" variants return back to the shader the datum that was present at the memory location before the "atomic" operation was performed. The "NoReturn" variants do not return any value back to the shader. Typically, in a GPU, all of the operations listed above are available in both variants (except Swap, which is not available in the NoReturn variant).

Typical examples of use-cases for GPU atomics include incremental memory allocators (Integer Add of the "Return" type), histograms (Integer Add of the "NoReturn" type) and bounding-box computation (Minimum/Maximum Value of the "NoReturn" type).

In a thread group-based (warp-based) GPU architecture, when an atomic instruction is executed, it is typically started for all the threads in the group at the same time. This can lead to any one of several common cases: all of the atomics go to the same memory address; some but not all of the atomics go to a single memory address; or the atomics go to unrelated memory locations. If multiple atomics are performed on the same memory location, they need to be serialized. This is necessary to maintain the observable semantic that each of them has been performed either in full or not at all.

The Applicants believe that there remains scope for improvements to the handling of atomic operations for thread groups, for example in graphics processing pipelines that include one or more shader stages.

BRIEF DESCRIPTION OF THE DRAWINGS

A number of embodiments of the technology described herein will now be described by way of example only and with reference to the accompanying drawings, in which:

FIG. 1 shows an exemplary computer graphics processing system;

FIG. 2 shows schematically a graphics processing pipeline that can be operated in the manner of the technology described herein;

FIG. 7B shows an alternative embodiment to the operation depicted in FIGS. 4A and 4B.

FIG. 9B shows an alternative embodiment to the operation depicted in FIGS. 4A and 4B.

Like reference numerals are used for like components where appropriate in the drawings.

DETAILED DESCRIPTION

Figure 3:
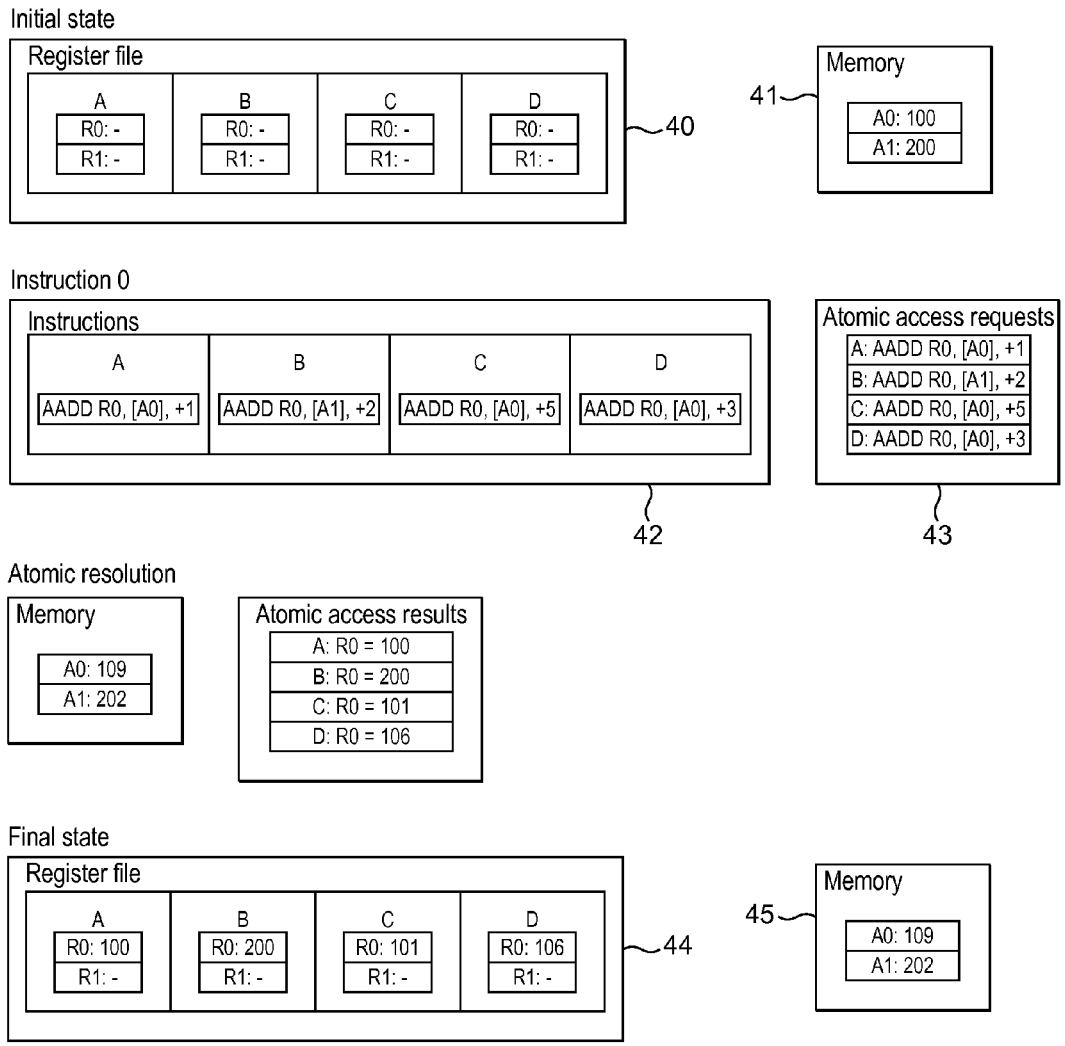
FIG. 3 shows schematically the conventional processing of an atomic memory operation for a group of threads.

A first embodiment of the technology described herein comprises a method of operating a data processing system which includes an execution pipeline that includes one or more programmable execution stages which execute instructions to perform data processing operations, and in which execution threads may be grouped together into thread groups in which the threads of the group are executed in lockstep, one instruction at a time, the method comprising:

for an atomic operation to be executed for a thread group by an execution stage of the execution pipeline, the atomic operation having an associated arithmetic operation:

issuing to the execution stage an instruction or instructions to determine whether there is a set of threads in the thread group for which the atomic operation for the threads accesses the same memory location; and to, if such a set of threads is identified, perform the atomic operation for the set of threads by:

providing to the second thread in the set of threads, the first thread's register value for the atomic operation, performing for the second thread in the set of threads the arithmetic operation for the atomic operation using the second thread's register value for the atomic operation and the first thread's register value for the atomic operation, and performing for each thread in the set of threads other than the first and second threads, if any, the arithmetic operation for the atomic operation using the thread's register value for the atomic operation and the result of the arithmetic operation for the preceding thread in the set of threads, to thereby generate for the final thread in the identified set of threads a combined result of the arithmetic operation for the set of threads; and then executing, for the identified set of threads, a single atomic memory operation to the memory location for the atomic operation for the set of threads using the combined result of the arithmetic operation for the set of threads as its register argument; and the execution stage of the execution pipeline in response to the instructions:

determining whether there is a set of threads in the thread group for which the atomic operation for the threads accesses the same memory location; and, if such a set of threads is identified, performing the atomic operation for the set of threads by:

providing to the second thread in the set of threads, the first thread's register value for the atomic operation;

performing for the second thread in the set of threads the arithmetic operation for the atomic operation using the second thread's register value for the atomic operation and the first thread's register value for the atomic operation; and performing for each thread in the set of threads other than the first and second threads, if any, the arithmetic operation for the atomic operation using the thread's register value for the atomic operation and the result of the arithmetic operation for the preceding thread in the set of threads, to thereby generate for the final thread in the identified set of threads a combined result of the arithmetic operation for the set of threads; and then executing for the identified set of threads a single atomic memory operation to the memory location for the atomic operation for the set of threads using the combined result of the arithmetic operation for the set of threads as its register argument.

A second embodiment of the technology described herein comprises a data processing system comprising:

an execution pipeline that includes one or more programmable execution stages which execute instructions to perform data processing operations provided to the execution pipeline by the host processor and in which execution threads may be grouped together into thread groups in which the threads of the group are executed in lockstep, one instruction at a time; and a compiler that compiles programs for the execution pipeline to generate instructions for execution stages of the execution pipeline;

wherein the compiler is configured to, for an atomic operation to be executed for a thread group by an execution stage of the execution pipeline, the atomic operation having an associated arithmetic operation:

issue to the execution stage an instruction or instructions to determine whether there is a set of threads in the thread group for which the atomic operation for the threads accesses the same memory location; and to, if such a set of threads is identified, perform the atomic operation for the set of threads by:

providing to the second thread in the set of threads, the first thread's register value for the atomic operation, performing for the second thread in the set of threads the arithmetic operation for the atomic operation using the second thread's register value for the atomic operation and the first thread's register value for the atomic operation, and performing for each thread in the set of threads other than the first and second threads, if any, the arithmetic operation for the atomic operation using the thread's register value for the atomic operation and the result of the arithmetic operation for the preceding thread in the set of threads, to thereby generate for the final thread in the identified set of threads a combined result of the arithmetic operation for the set of threads;

then executing for the identified set of threads a single atomic memory operation to the memory location for the atomic operation for the set of threads using the combined result of the arithmetic operation for the set of threads as its register argument; and and wherein:

at least one execution stage of the execution pipeline is configured to, in response to the instructions:

determine whether there is a set of threads in the thread group for which the atomic operation for the threads accesses the same memory location; and, if such a set of threads is identified, perform the atomic operation for the set of threads by:

providing to the second thread in the set of threads, the first thread's register value for the atomic operation;

performing for the second thread in the set of threads the arithmetic operation for the atomic operation using the second thread's register value for the atomic operation and the first thread's register value for the atomic operation; and performing for each thread in the set of threads other than the first and second threads, if any, the arithmetic operation for the atomic operation using the thread's register value for the atomic operation and the result of the arithmetic operation for the preceding thread in the set of threads, to thereby generate for the final thread in the identified set of threads a combined result of the arithmetic operation for the set of threads; and then executing for the identified set of threads a single atomic memory operation to the memory location for the atomic operation for the set of threads using the combined result of the arithmetic operation for the set of threads as its register argument.

The technology described herein relates to the execution of atomic memory operations in data processing pipelines in which execution threads may be grouped together into thread groups ("warps"). In the technology described herein, when an atomic operation is to be performed for a thread group, the execution stage that is to perform the atomic operation identifies a set of threads in the thread group that will access the same address in memory for the atomic operation (if present), and then performs the atomic operation for those threads by combining the results of the arithmetic operation for the atomic memory operation for those threads without issuing the atomic memory access request for any of the threads, and then issuing a single atomic memory access request for the set of threads, using the combined result for the set of threads, to perform the atomic operation for the set of threads. This operation is triggered by the inclusion of appropriate instructions in the instruction stream for the execution stage (unit) in question.

This effectively "merges" or "coalesces" the individual atomic memory requests for the threads in the set of threads into a single atomic memory access request. This can then facilitate reducing the number of atomic memory accesses that actually need to be performed against memory for a thread group, whilst (as will be discussed further below) still fully retaining the semantics of the atomic operation. This can then significantly improve atomic memory operation performance and lead to reduced power consumption (e.g. due to reduced cache activity).

As will be discussed further below, the above steps are required for both no return and return atomics, but for return atomics further steps may be required (and are in an embodiment performed).

As discussed above, it is believed that the technology described herein will have particular application in graphics processing systems. Thus the data processing system in an embodiment comprises a graphics processing system, the execution pipeline in an embodiment comprises a graphics processing pipeline, and the execution stages in an embodiment comprise one or more programmable graphics shading stages (shaders) which execute graphics shader programs to perform graphics processing operations. However, the technology described herein is equally applicable to other forms of data processing system, e.g. having processing units with lock-step parallelism, such as in CPUs with SIMD instructions (where atomic-merging across SIMD lanes could then be done in a corresponding manner).

The atomic memory operations that can be handled in the manner of the technology described herein may be any suitable and desired atomic memory operations. In an embodiment there is set of particular, selected atomic memory operations that will be handled in the manner of the technology described herein (and so it is determined if any atomic memory operations of the particular type or types are present). In an embodiment, the atomic memory operations that will be handled in the manner of the technology described herein include atomic operations for which the arithmetic operation that is performed as part of the atomic is associative, and in an embodiment both commutative and associative. However, this is not essential and the technology described herein can also be used for other atomic operations, such as Swap (Exchange) and Compare-And-Swap (Compare-and-Exchange) that do not have these properties, if desired.

In an embodiment, the atomic memory operations that will be handled in the manner of the technology described herein comprise one or more of, and in an embodiment all of: Integer Add; Bitwise AND, OR, XOR; Minimum Value; Maximum Value; Saturating unsigned integer add; Integer multiply; floating-point add; floating point multiply; integer add, modulo a constant K.

The atomic memory operations that are handled in the manner of the technology described herein in an embodiment have an appropriate "identity value". This "identity value" is a value for the arithmetic operation for the atomic operation that will leave the value that the identity value is combined with for the arithmetic operation unchanged (i.e. such that if a given arithmetic operation is denoted with the operator %, then arithmetic operation's identity value is a value V such that for all possible input values X, V % X=X % V=X). Thus, for example, for an integer ADD operation the identity value is "0", for a bitwise OR or bitwise XOR operation, the identity value="0", for a bitwise AND, the identity value is an all ones bit vector, for a minimum value operation, the identity value is the largest representable number in the memory value's format, and for a maximum value operation, the identity value is the smallest representable number in the memory values' format (and so on).

Identity values for other atomic memory operations can be determined correspondingly.

The determining of whether there is a set of threads in the thread group for which the atomic operation for the threads accesses the same memory location can be performed in any suitable and desired manner. In an embodiment there are more than two threads in the set of threads.

In an embodiment the memory addresses for the atomic operation across the threads in the thread group are compared, and the comparison result then used to identify a set of threads in the thread group that all use the same memory address (if present). This comparison and selection operation can be performed as desired. For example, the addresses of every thread could simply be compared to the address of the first thread, and then the set of threads formed from the first thread and whichever other threads in the thread group use the same memory address. Alternatively, a comparison of the addresses between every possible pair of threads could be performed, and the comparison result used to identify the largest set of threads that share an address. In an embodiment, the execution stage is configured to use a particular, in an embodiment predetermined, process for this, whenever it receives the relevant instruction for execution.

It would also be possible to determine and identify more than one set of threads in the thread group for which the atomic operation for the threads share the same address. In this case each set of threads that shares the same address would perform its atomic operation in the manner of the technology described herein.

Where a set of threads for which the atomic operation accesses the same memory location has been identified, then in an embodiment metadata that allows this set of threads to be identified, for example, and in an embodiment, in the form of a bitmap, is generated and stored. This will then allow later operations and instructions to identify which threads in the thread group belong to the set in question. This metadata (e.g. bitmap) may be stored as desired, for example as sideband information related to the atomic processing, or in a register associated with one of the threads in the set. In an embodiment, the metadata indicating which threads are in the set is stored in a register associated with the first thread in the set. Where the set of threads starts with a thread that is not the first thread in the thread group, a sideband signal could be used to indicate which thread has this metadata.

To combine the results of the arithmetic operation for the threads in the set, the first thread's register value for the atomic operation is provided to the second thread in the set of threads, the arithmetic operation for the atomic operation is then performed for the second thread using the second thread's register value for the atomic operation and the first thread's register value for the atomic operation, and the arithmetic operation for the atomic operation is then performed for each thread in the set of threads other than the first and second threads (for the subsequent (remaining) threads (if any) in the set of threads) using the thread's register value for the atomic operation and the result of the arithmetic operation for the preceding thread in the set of threads.

In an embodiment, the register value for the atomic operation for the first thread is provided to the second thread by performing for the first thread in the set of threads, the arithmetic operation for the atomic operation using an identity value for the arithmetic operation for the atomic operation and the first thread's register value for the atomic operation. However, alternative arrangements for providing the first thread's register value to the second thread could be used if desired. For example, a "move" ("bypass") operation or instruction that transfers the register value to the second thread could be used, if desired. (In general any operation that does not change the register value and that provides it to the second thread could be used, such as any arithmetic operation with the arithmetic operation's identity value.) Performing the arithmetic operation with the identity value for this purpose may be advantageous, as it can avoid the need to otherwise indicate or identify that a special operation needs to be performed for the thread in question.

Thus, in an embodiment, the first thread in the set takes the arithmetic operation's identity value and combines that value with its "register" atomic input value (performs the arithmetic operation for the atomic using the identity value and its register value) and then passes the result to the second thread in the set. The second thread in an embodiment then combines the result it received from the first thread with its own "register" atomic input value (performs the arithmetic operation for the atomic using the identity value and its register value) and passes that result to the third thread, and so on, until all the threads in the set have produced a result value. The final result from the last of the threads in the set is then used as the "register" argument for the single atomic memory access operation for the set of threads (which can then be performed).

This process could be performed in a serial manner, or in a parallel prefix manner (where that is possible).

The combined result of the arithmetic operation for the set of threads is in an embodiment stored for use by the subsequent single atomic memory access operation to the memory location for the atomic operation for the set of threads. Again, this combined result could be stored as sideband information or in a register associated with one or the threads in the set. In an embodiment it is stored in a register associated with the first thread in the set.

The above operation of performing the combined and merged atomic operation will provide the appropriate result value in the memory location for the atomic operation. Thus for a "no return" atomic, the process can be stopped at this point.

However, where the atomic is of the "return" variant, it is also necessary for each individual thread to return the datum that was present at the memory location before the atomic operation for that individual thread was performed. To achieve this, as well as performing the single merged atomic operation to provide the final result in the memory location, it is also necessary to ensure that each individual thread in the set returns its appropriate value.

To facilitate this, in an embodiment of the technology described herein, the first thread in the set stores the identity value for the arithmetic operation (in an embodiment in a register associated with the thread), and each subsequent thread in the set when it performs the arithmetic operation also stores the result from the previous thread in the set (e.g., and in an embodiment, in a register associated with the thread in question). Then, when the single "merged" atomic operation is performed, the result of the merged atomic operation (i.e. the original value in the memory location) is in an embodiment distributed to all the threads in the set, and each thread then performs the arithmetic operation for the atomic operation to combine the value in the memory location with the value that it had stored (e.g. in its register). This will then generate the appropriate "return" values for each thread in the set.

In these arrangements the result of the "merged" atomic memory access request could, e.g., be stored in a second register for each thread (such that each thread would then have stored for it the merged atomic operation result value) or, alternatively, the result value could be stored in a register associated with one of the threads (such as, and in an embodiment, the first thread in the set), and the other threads in the set could then use that register value for their arithmetic operation.

Thus, in an embodiment, as well as each thread in the set performing the arithmetic operation and passing the result to the next thread in the set, there is also stored for each thread the arithmetic operation result for the previous thread in the set, and the process further comprises distributing the result of the single atomic memory access request to all the threads in the set, and each thread in the set then performing the arithmetic operation for the atomic operation to combine the result value with its own stored value.

In these arrangements, instead of the first thread performing the arithmetic operation using the identity value to return its register value, any equivalent operation or process that can achieve that (as discussed above) could be used instead, if desired. In this case, it would not or may not be necessary for the first thread to store the identity value for the arithmetic operation, if desired. The metadata indicating the threads in the set could, e.g., be used to identify the thread for which this operation needs to be performed.

The operation in the manner of the technology described herein is triggered by sending appropriate instructions to the execution pipeline. In an embodiment, two instructions are used to trigger the operation in the manner of the present embodiment, a "pre-processing" instruction, and a "modified" thread group atomic instruction. The pre-processing instruction in an embodiment triggers the execution unit to determine whether there is a set of threads in the thread group that all access the same memory address, and if there is, to perform the arithmetic operation, and where desired (e.g. in the case of a "return" variant atomic), to also store the necessary argument value.

The output of this pre-processing instruction is in an embodiment the combined arithmetic operation result value for the set of threads and the metadata, e.g. bitmap, indicating the threads in the thread group that are in the set.

The modified thread group atomic instruction in an embodiment receives as its input arguments the memory address for the set of threads in question, the combined arithmetic operation result value for the set of threads, and the thread set-indicating metadata derived from the pre-processing instruction, and triggers the use of the thread set metadata to identify the threads in the set, and issues one atomic memory access operation for the threads in the set combined. Where the atomic operation is of the "return" variant, then the modified thread group atomic instruction in an embodiment also operates to distribute the value in the memory location to all the threads that are members of the set.

Where the atomic operation is of the "return" type, then as discussed above, the threads in the thread group then need to perform the arithmetic operation individually. In an embodiment this is achieved by including a further arithmetic instruction that corresponds to the arithmetic operation to trigger each thread to perform the arithmetic operation appropriately. (Although as discussed above, instead of the first thread performing the arithmetic operation using the identity value to return its register value, any equivalent operation or process that can achieve that (as discussed above) could be used instead, if desired.)

The above deals with the operation for the threads that are members of the set that use the same memory location. If there are other threads in the thread group that are not members of the set, then those threads in an embodiment perform their atomic operations in the conventional manner. To facilitate this, the pre-processing instruction in an embodiment triggers each thread in the thread group not in the set to store the identity value for the arithmetic operation in question, and the modified thread group atomic instruction in an embodiment issues one atomic memory access request for each thread in the thread group that is not a member of the set (and for "return"-type atomic operations, also returns the result of the atomic operations for those threads to each individual thread appropriately).

Similarly, where the atomic operation is of the "return" type, then as discussed above, the threads not in the set of threads will also need to perform the arithmetic operation individually. In an embodiment this is achieved by including a further arithmetic instruction that corresponds to the arithmetic operation to trigger each thread to perform the arithmetic operation appropriately.

In these arrangements, instead of the threads not in the set performing the arithmetic operation using the identity value to return their register values, any equivalent operation or process that can achieve that (as discussed above) could be used instead, if desired. In this use, it would not or may not be necessary for the threads to store the identity value for the arithmetic operation, if desired. The metadata indicating the threads in the set could, e.g., be used to identify the threads for which this operation needs to be performed.

In the case where no set of plural threads that use the same memory location is identified, then the atomic operation should be and in an embodiment is performed individually for each thread in the thread group, e.g., and in an embodiment, in the manner discussed above for threads that are not in the set of plural threads that use the same memory location, or in any other suitable manner.

The instructions for performing the above operation are included in the instruction stream for an execution stage of the execution pipeline by a compiler for the execution pipeline. Thus, in the case of a graphics processing system, the shader compiler for the graphics processing pipeline in an embodiment performs this operation. The compiler may, e.g., and in an embodiment does, run on a host processor of the data processing system that includes the execution pipeline (with the execution pipeline then being on another processor, such as a graphics processor that is associated with the host processor (such that the compiler and compiled code all run on separate processors within the overall data processing system, e.g. graphics processing system)). However, other arrangements would be possible, such as a compiler running on the same processor as the compiled code, or the compiler being run on a separate processor, such as the program being pre-compiled on a separate system and being distributed in a compiled form.

The compiler may, for example, recognise the presence of an atomic operation in the instruction stream, and then issue appropriate instruction sequences as discussed above to trigger the operation in the manner of the present embodiment by the execution unit. The compiler could also, as appropriate, either include or omit any post-atomic memory access arithmetic operation instruction depending on whether the atomic is of the return or no return type (the atomic operation will itself specify this, and the compiler will be able to identify this and then configure its instructions accordingly). The compiler could also, e.g., recognise if the application contains a "return" atomic, but doesn't actually use the result, and then optimise the atomic into a "no return" atomic, if desired.

The technology described herein also extends to the compiler itself. Thus, another embodiment of the technology described herein comprises a compiler that compiles programs to generate instructions for execution stages of an execution pipeline that includes one or more programmable execution stages that execute instructions to perform data processing operations, and in which execution threads may be grouped together into thread groups in which the threads of the group are executed in lockstep, one instruction at a time, wherein the compiler is configured to for an atomic operation to be executed for a thread group by an execution stage of the execution pipeline, the atomic operation having an associated arithmetic operation:

issue to the execution stage an instruction or instructions to determine whether there is a set of threads in the thread group for which the atomic operation for the threads accesses the same memory location; and to, if such a set of threads is identified, perform the atomic operation for the set of threads by:

providing to the second thread in the set of threads, the first thread's register value for the atomic operation, performing for the second thread in the set of threads the arithmetic operation for the atomic operation using the second thread's register value for the atomic operation and the first thread's register value for the atomic operation, and performing for each thread in the set of threads other than the first and second threads, if any, the arithmetic operation for the atomic operation using the thread's register value for the atomic operation and the result of the arithmetic operation for the preceding thread in the set of threads, to thereby generate for the final thread in the identified set of threads a combined result of the arithmetic operation for the set of threads; and then executing, for the identified set of threads, a single atomic memory operation to the memory location for the atomic operation for the set of threads using the combined result of the arithmetic operation for the set of threads as its register argument.

Another embodiment of the technology described herein comprises a method of compiling a program to generate instructions for an execution stage of an execution pipeline that includes one or more programmable execution stages that execute instructions to perform data processing operations, and in which execution threads may be grouped together into thread groups in which the threads of the group are executed in lockstep, one instruction at a time, the method comprising:

for an atomic operation to be executed for a thread group by an execution stage of the execution pipeline, the atomic operation having an associated arithmetic operation:

issuing to the execution stage an instruction or instructions to determine whether there is a set of threads in the thread group for which the atomic operation for the threads accesses the same memory location; and to, if such a set of threads is identified, perform the atomic operation for the set of threads by:

providing to the second thread in the set of threads, the first thread's register value for the atomic operation, performing for the second thread in the set of threads the arithmetic operation for the atomic operation using the second thread's register value for the atomic operation and the first thread's register value for the atomic operation, and performing for each thread in the set of threads other than the first and second threads, if any, the arithmetic operation for the atomic operation using the thread's register value for the atomic operation and the result of the arithmetic operation for the preceding thread in the set of threads, to thereby generate for the final thread in the identified set of threads a combined result of the arithmetic operation for the set of threads; and then executing, for the identified set of threads, a single atomic memory operation to the memory location for the atomic operation for the set of threads using the combined result of the arithmetic operation for the set of threads as its register argument.

The technology described herein also extends to an execution pipeline having execution stages that can perform atomics processing in response to (and using) the instructions of the technology described herein.

Thus, another embodiment of the technology described herein comprises an execution pipeline for a data processing system that includes one or more programmable execution stages which execute instructions to perform data processing operations, and in which execution threads may be grouped together into thread groups in which the threads of the group are executed in lockstep, one instruction at a time, wherein:

at least one execution stage of the execution pipeline is configured to, when executing instructions in an instruction stream, in response to a set of instructions in the instruction stream for performing an atomic operation provided by a compiler for the execution stage:

determine whether there is a set of threads in the thread group for which the atomic operation for the threads accesses the same memory location; and, if such a set of threads is identified, perform the atomic operation for the set of threads by:

providing to the second thread in the set of threads, the first thread's register value for the atomic operation;

performing for the second thread in the set of threads the arithmetic operation for the atomic operation using the second thread's register value for the atomic operation and the first thread's register value for the atomic operation; and performing for each thread in the set of threads other than the first and second threads, if any, the arithmetic operation for the atomic operation using the thread's register value for the atomic operation and the result of the arithmetic operation for the preceding thread in the set of threads, to thereby generate for the final thread in the identified set of threads a combined result of the arithmetic operation for the set of threads; and then executing for the identified set of threads a single atomic memory operation to the memory location for the atomic operation for the set of threads using the combined result of the arithmetic operation for the set of threads as its register argument for the set of threads.

Another embodiment of the technology described herein comprises a method of operating an execution pipeline for a data processing system that includes one or more programmable execution stages which execute instructions to perform data processing operations, and in which execution threads may be grouped together into thread groups in which the threads of the group are executed in lockstep, one instruction at a time, the method comprising:

at least one execution stage of the execution pipeline, when executing instructions in an instruction stream, in response to a set of instructions in the instruction stream for performing an atomic operation provided by a compiler for the execution stage:

determining whether there is a set of threads in the thread group for which the atomic operation for the threads accesses the same memory location; and, if such a set of threads is identified, performing the atomic operation for the set of threads by:

providing to the second thread in the set of threads, the first thread's register value for the atomic operation;

performing for the second thread in the set of threads the arithmetic operation for the atomic operation using the second thread's register value for the atomic operation and the first thread's register value for the atomic operation; and performing for each thread in the set of threads other than the first and second threads, if any, the arithmetic operation for the atomic operation using the thread's register value for the atomic operation and the result of the arithmetic operation for the preceding thread in the set of threads, to thereby generate for the final thread in the identified set of threads a combined result of the arithmetic operation for the set of threads; and then executing for the identified set of threads a single atomic memory operation to the memory location for the atomic operation for the set of threads using the combined result of the arithmetic operation for the set of threads as its register argument for the set of threads.

As will be appreciated by those skilled in the art, these embodiments of the technology described herein can and in embodiments do include any one or more or all of the features of the technology described herein, as appropriate.

In the case of a graphics processing pipeline, the execution units (stages) in an embodiment comprise programmable, shading stages of the graphics processing pipeline such as the vertex shader, fragment shader, etc. These stages can be implemented as desired and in any suitable manner, and can perform any desired and suitable shading, e.g. vertex shading, fragment shading, etc., functions, respectively and as appropriate. In the case of a fragment shader, for example, the fragment shader may render a primitive or primitives to generate a set of render output values, e.g. representing a frame for display. These output values may then be exported to external memory for storage and use, such as to a frame buffer for a display.

In an embodiment all the execution stages (each execution stage) of the execution pipeline can and does operate in the manner of the technology described herein.

Each programmable processing stage (execution unit) may comprise any suitable programmable hardware element such as programmable processing circuitry. Each programmable processing stage may be provided as a separate circuit element to other programmable stages of the processing pipeline or the programmable processing stages may share some or all of their programmable processing circuitry (that is then differently programmed to serve as the desired programmable processing stage).

As well as the programmable processing (shader) stages, a graphics processing pipeline may also contain any other suitable and desired processing stages that a graphics processing pipeline may contain such as a rasteriser, an early depth (or an early depth and stencil) tester, a late depth (or depth and stencil) tester, a blender, a tile buffer, a write out unit, etc.

The technology described herein can be used for all forms of output that a graphics processing pipeline may be used to generate, such as frames for display, render-to-texture outputs, etc. The output, e.g. fragment shaded, data values from the graphics processing are in an embodiment exported to external, e.g. main, memory, for storage and use, such as to a frame buffer for a display.

In some embodiments, the graphics processing pipeline comprises, and/or is in communication with, one or more memories and/or memory devices that store the data described herein, and/or store software for performing the processes described herein. The graphics processing pipeline may also be in communication with a host microprocessor, and/or with a display for displaying images based on the data generated by the graphics processor.

The technology described herein is applicable to any suitable form or configuration of graphics processor. It is particularly applicable to tile-based graphics processors and graphics processing systems. Thus in an embodiment, the graphics processing system and graphics processing pipeline are a tile-based system and pipeline, respectively.

In an embodiment, the various functions of the technology described herein are carried out on a single graphics processing platform that generates and outputs the rendered fragment data that is, e.g., written to the frame buffer for the display device.

The technology described herein can be implemented in any suitable system, such as a suitably configured microprocessor based system. In an embodiment, the technology described herein is implemented in a computer and/or microprocessor based system.

The various functions of the technology described herein can be carried out in any desired and suitable manner. For example, the functions of the technology described herein can be implemented in hardware or software, as desired. Thus, for example, unless otherwise indicated, the various functional elements and "means" of the technology described herein may comprise a suitable processor or processors, controller or controllers, functional units, circuitry, processing logic, microprocessor arrangements, etc., that are operable to perform the various functions, etc., such as appropriately dedicated hardware elements and/or programmable hardware elements that can be programmed to operate in the desired manner.

It should also be noted here that, as will be appreciated by those skilled in the art, the various functions, etc., of the technology described herein may be duplicated and/or carried out in parallel on a given processor. Equally, the various processing stages may share processing circuitry, etc., if desired.

Subject to any hardware necessary to carry out the specific functions discussed above, the data processing system and pipeline can otherwise include any one or more or all of the usual functional units, etc., that data processing pipelines include.

It will also be appreciated by those skilled in the art that all of the described embodiments of the technology described herein can, and in embodiments do, include, as appropriate, any one or more or all of the features described herein.

The methods in accordance with the technology described herein may be implemented at least partially using software e.g. computer programs. It will thus be seen that when viewed from further embodiments the technology described herein comprises computer software specifically adapted to carry out the methods herein described when installed on a data processor, a computer program element comprising computer software code portions for performing the methods herein described when the program element is run on a data processor, and a computer program comprising code adapted to perform all the steps of a method or of the methods herein described when the program is run on a data processing system. The data processor may be a microprocessor system, a programmable FPGA (field programmable gate array), etc.

The technology described herein also extends to a computer software carrier comprising such software which when used to operate a graphics processor, renderer or microprocessor system comprising a data processor causes in conjunction with said data processor said processor, renderer or system to carry out the steps of the methods of the technology described herein. Such a computer software carrier could be a physical storage medium such as a ROM chip, CD ROM, RAM, flash memory, or disk, or could be a signal such as an electronic signal over wires, an optical signal or a radio signal such as to a satellite or the like.

It will further be appreciated that not all steps of the methods of the technology described herein need be carried out by computer software and thus from a further broad embodiment the technology described herein comprises computer software and such software installed on a computer software carrier for carrying out at least one of the steps of the methods set out herein.

The technology described herein may accordingly suitably be embodied as a computer program product for use with a computer system. Such an implementation may comprise a series of computer readable instructions either fixed on a tangible, non-transitory medium, such as a computer readable medium, for example, diskette, CD-ROM, ROM, RAM, flash memory, or hard disk. It could also comprise a series of computer readable instructions transmittable to a computer system, via a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described herein.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, pre-loaded with a computer system, for example, on a system ROM or fixed disk, or distributed from a server or electronic bulletin board over a network, for example, the Internet or World Wide Web.

A number of embodiments of the technology described herein will now be described in the context of the processing of computer graphics for display.

FIG. 1 shows a typical computer graphics processing system.

An application 2, such as a game, executing on a host processor 1 will require graphics processing operations to be performed by an associated graphics processing unit (graphics processing pipeline) 3. To do this, the application will generate API (Application Programming Interface) calls that are interpreted by a driver 4 for the graphics process pipeline 3 that is running on the host processor 1 to generate appropriate commands to the graphics processor 3 to generate graphics output required by the application 2. To facilitate this, a set of "commands" will be provided to the graphics processor 3 in response to commands from the application 2 running on the host system 1 for graphics output (e.g. to generate a frame to be displayed).

FIG. 2 shows the graphics processing pipeline 3 of the present embodiment in more detail.

The graphics processing pipeline 3 shown in FIG. 2 is a tile-based renderer and will thus, as is known in the art, produce tiles of a render output data array, such as an output frame to be generated.

(As is known in the art, in tile-based rendering, rather than the entire render output, e.g., frame, effectively being processed in one go as in immediate mode rendering, the render output, e.g., frame to be displayed, is divided into a plurality of smaller sub-regions, usually referred to as "tiles". Each tile (sub-region) is rendered separately (typically one-after-another), and the rendered tiles (sub-regions) are then recombined to provide the complete render output, e.g., frame for display. In such arrangements, the render output is typically divided into regularly-sized and shaped sub-regions (tiles) (which are usually, e.g., squares or rectangles), but this is not essential.)

The render output data array may, as is known in the art, typically be an output frame intended for display on a display device, such as a screen or printer, but may also, for example, comprise intermediate data intended for use in later rendering passes (also known as a "render to texture" output), etc.

(As is known in the art, when a computer graphics image is to be displayed, it is usually first defined as a series of primitives (polygons), which primitives are then divided (rasterised) into graphics fragments for graphics rendering in turn. During a normal graphics rendering operation, the renderer will modify the (e.g.) colour (red, green and blue, RGB) and transparency (alpha, a) data associated with each fragment so that the fragments can be displayed correctly. Once the fragments have fully traversed the renderer, then their associated data values are stored in memory, ready for output, e.g. for display.)

FIG. 2 shows the main elements and pipeline stages of the graphics processing pipeline 3 that are relevant to the operation of the present embodiment. As will be appreciated by those skilled in the art there may be other elements of the graphics processing pipeline that are not illustrated in FIG. 2. It should also be noted here that FIG. 2 is only schematic, and that, for example, in practice the shown functional units and pipeline stages may share significant hardware circuits, even though they are shown schematically as separate stages in FIG. 2. It will also be appreciated that each of the stages, elements and units, etc., of the graphics processing pipeline as shown in FIG. 2 may be implemented as desired and will accordingly comprise, e.g., appropriate circuitry and/or processing logic, etc., for performing the necessary operation and functions.

As shown in FIG. 2, the graphics processing pipeline 3 includes a number of stages, including vertex shader 20, a hull shader 21, a tesselator 22, a domain shader 23, a geometry shader 24, a rasterisation stage 25, an early Z (depth) and stencil test stage 26, a renderer in the form of a fragment shading stage 27, a late Z (depth) and stencil test stage 28, a blending stage 29, a tile buffer 30 and a downsampling and writeout (multisample resolve) stage 31.

The vertex shader 20, as is known in the art, takes the input data values associated with the vertices, etc., defined for the output to be generated, and processes those data values to generate a set of corresponding "vertex shaded" output data values for use by subsequent stages of the graphics processing pipeline 3. The vertex shading, for example, modifies the input data to take account of the effect of lighting in the image to be rendered.

As is known in the art, the hull shader 21 performs operations on sets of patch control points and generates additional data known as patch constants, the tessellation stage 22 subdivides geometry to create higher-order representations of the hull, the domain shader 23 performs operations on vertices output by the tessellation stage (similar to a vertex shader), and the geometry shader 24 processes entire primitives such as a triangles, points or lines. These stages together with the vertex shader 21 effectively perform all the necessary fragment frontend operations, such as transformation and lighting operations, and primitive setup, to setup the primitives to be rendered, in response to commands and vertex data provided to the graphics processing pipeline 3.

The rasterisation stage 25 of the graphics processing pipeline 3 operates, as is known in the art, to rasterise the primitives making up the render output (e.g. the image to be displayed) into individual graphics fragments for processing. To do this, the rasteriser 25 receives graphics primitives for rendering, rasterises the primitives to sampling points and generates graphics fragments having appropriate positions (representing appropriate sampling positions) for rendering the primitives.

The fragments generated by the rasteriser are then sent onwards to the rest of the pipeline for processing.

The early Z/stencil stage 26 performs, is known in the art, a Z (depth) test on fragments it receives from the rasteriser 25, to see if any fragments can be discarded (culled) at this stage. To do this, it compares the depth values of (associated with) fragments issuing from the rasteriser 25 with the depth values of fragments that have already been rendered (these depth values are stored in a depth (Z) buffer that is part of the tile buffer 30) to determine whether the new fragments will be occluded by fragments that have already been rendered (or not). At the same time, an early stencil test is carried out.

Fragments that pass the fragment early Z and stencil test stage 26 are then sent to the fragment shading stage 27. The fragment shading stage 27 performs the appropriate fragment processing operations on the fragments that pass the early Z and stencil tests, so as to process the fragments to generate the appropriate rendered fragment data, as is known in the art.

This fragment processing may include any suitable and desired fragment shading processes, such as executing fragment shader programs on the fragments, applying textures to the fragments, applying fogging or other operations to the fragments, etc., to generate the appropriate fragment data, as is known in the art. In the present embodiment, the fragment shading stage 27 is in the form of a shader pipeline (a programmable fragment shader).

There is then a "late" fragment Z and stencil test stage 28, which carries out, inter alia, an end of pipeline depth test on the shaded fragments to determine whether a rendered fragment will actually be seen in the final image. This depth test uses the Z-buffer value for the fragment's position stored in the Z-buffer in the tile buffer 30 to determine whether the fragment data for the new fragments should replace the fragment data of the fragments that have already been rendered, by, as is known in the art, comparing the depth values of (associated with) fragments issuing from the fragment shading stage 27 with the depth values of fragments that have already been rendered (as stored in the depth buffer). This late fragment depth and stencil test stage 28 also carries out any necessary "late" alpha and/or stencil tests on the fragments.

The fragments that pass the late fragment test stage 28 are then subjected to, if required, any necessary blending operations with fragments already stored in the tile buffer 30 in the blender 29. Any other remaining operations necessary on the fragments, such as dither, etc. (not shown) are also carried out at this stage.

Finally, the (blended) output fragment data (values) are written to the tile buffer 30 from where they can, for example, be output to a frame buffer for display. The depth value for an output fragment is also written appropriately to a Z-buffer within the tile buffer 30. (The tile buffer will store, as is known in the art, colour and depth buffers that store an appropriate colour, etc., or Z-value, respectively, for each sampling point that the buffers represent (in essence for each sampling point of a tile that is being processed).) These buffers store, as is known in the art, an array of fragment data that represents part (a tile) of the overall render output (e.g. image to be displayed), with respective sets of sample values in the buffers corresponding to respective pixels of the overall render output (e.g. each 2×2 set of sample values may correspond to an output pixel, where 4× multisampling is being used).

The tile buffer is provided as part of RAM that is located on (local to) the graphics processing pipeline (chip).

The data from the tile buffer 30 is input to a downsampling (multisample resolve) write out unit 31, and thence output (written back) to an external memory output buffer, such as a frame buffer of a display device (not shown). (The display device could comprise, e.g., a display comprising an array of pixels, such as a computer monitor or a printer.)

The downsampling and writeout unit 31 downsamples the fragment data stored in the tile buffer 30 to the appropriate resolution for the output buffer (device) (i.e. such that an array of pixel data corresponding to the pixels of the output device is generated), to generate output values (pixels) for output to the output buffer.

Once a tile of the render output has been processed and its data exported to a main memory (e.g. to a frame buffer in a main memory (not shown)) for storage, the next tile is then processed, and so on, until sufficient tiles have been processed to generate the entire render output (e.g. frame (image) to be displayed). The process is then repeated for the next render output (e.g. frame) and so on.

Other arrangements for the graphics processing pipeline 3 would, of course, be possible.

The above describes certain features of the operation of the graphics processing system shown in FIG. 1. Further features of the operation of the graphics processing system shown in FIG. 1 in accordance with embodiments of the technology described herein will now be described.

As can be seen from FIG. 2, the graphics processing pipeline 3 includes a number of programmable processing or "shader" stages, namely the verbex shader 20, hull shader 21, domain shader 23, geometry shader 24, and the fragment shader 27. These programmable shader stages execute respective shader programs that have one or more input variables and generate sets of output variables and that are provided by the application. To do this, the application 2 provides the shader programs implemented using a high-level shader programming language, such as GLSL, HLSL, OpenCL, etc. These shader programs are then translated by a shader language compiler to binary code for the target graphics processing pipeline 3. This may include, as is known in the art, the creation of one or more intermediate representations of the program within the compiler. (The compiler may, e.g., be part of the driver 4, with there being a special API call to cause the compiler to run. The compiler execution can thus be seen as being part of the draw call preparation done by the driver in response to API calls generated by an application).

As discussed above, each shader in the graphics processing pipeline is a processing unit that performs graphics processing by running small programs for each graphics item in a graphics output to be generated (an "item" in this regard is usually a vertex, a fragment or a pixel). The present embodiments relate to the situation where execution threads to be executed by a shader (where each thread corresponds to one graphics item) have been organised into a "group" or "bundle" of threads that are to be run in lockstep, one instruction at a time, and are to perform an atomic memory operation.

As discussed above, an "atomic" memory operation is an operation sequence that reads a memory location, performs an arithmetic operation between the memory value and a register value, and then writes the result of the arithmetic operation back to the same memory location. This sequence of operations is carried out so that to every observer, it looks as if the sequence has either not been performed at all, or been performed in its entirety. It is executed as one indivisible unit, hence the name "atomic". The arithmetic operation that is performed as part of the atomic is usually a simple operation, that is usually both commutative and associative, such as: Integer Add; Bitwise AND, OR, XOR; Minimum Value; Maximum Value.

Atomic memory operations typically occur in two variants: "Return" and "NoReturn". The "Return" variants return back to the shader the datum that was present at the memory location before the "atomic" operation was performed. The "NoReturn" variants do not return any value back to the shader.

The present embodiments perform atomic operations for thread groups by first identifying threads in a thread group for which the atomic operation goes to the same memory location. The arithmetic sub-operation associated with the atomic operation is then used to combine the register arguments for the identified threads, and a single "merged" atomic memory operation to the memory location using the combined register arguments value as its register argument is then executed. This has the effect that a single atomic memory operation is performed for the identified threads, but still provides the correct atomic semantics for any observers outside the executing thread group itself (as what they will observe is that of the atomic operations, either none have been performed or all have been performed).

In the present embodiment, the register arguments for the identified threads that go to the same memory location (address) are combined by a prefix calculation across all the threads that are to participate in the merged atomic. This prefix calculation is done as follows.

First, the first thread participating in the merged atomic operation takes the identity value for the arithmetic operation for the atomic, and stores it in a register for the thread. The first thread then combines the identity value with its "register" atomic input value, and passes the result to the second thread participating in the merged atomic. The second thread stores the result it receives from the first thread, and combines that value with its own "register" atomic input value, and passes the result to the next thread participating in the merged atomic (if any), and so on, until all of the participating threads have stored one value received from the preceding thread and produced a result value.

The merged "atomic" memory access operation is then performed, using the result value from the last of the participating threads as the "register" argument for the "merged" atomic.

Finally, the result of the merged atomic (i.e. the value stored in the memory location) is received and distributed to all the participating threads. Each participating thread then performs the arithmetic operation for the atomic, to combine the atomic result value with its own stored value from the prefix calculation. This ensures that the correct semantics between threads inside the thread group are obtained as well.

The arithmetic operation's "identity value" for this process is a value that when the arithmetic operation is performed with another value, leaves that other value unchanged. Thus, if a given arithmetic operation is denoted with the operator %, the arithmetic operation's identity value is a value V such that for all possible input values X, V % X=X % V=X. For example, for following arithmetic operations, the corresponding identity values V are:

Integer Add: V=0
Bitwise OR, Bitwise XOR: V=0
Bitwise AND: V=an all-1s bitvector
Minimum Value: V=the largest representable number in the memory value's format
Maximum Value: V=the smallest representable number in the memory value's format.

By way of example, for a thread group containing 4 threads (T0,T1,T2,T3), with the register values 2, 4, 6, 8 respectively, executing an atomic integer add to a memory location M containing the value 21, the above operation will proceed as follows.

Firstly, as the identity value for "Integer Add" is 0, the thread T0 will store the value 0, and pass the value 2 to thread T1.

Thread T1 will receive the value 2, and store it, and then combine the value 2 with its own register value, resulting in 2+4=6. This value is passed to thread T2.

Thread T2 will receive the value 6, and store it, and then combine the value 6 with its own register value, resulting in 6+6=12. This value is passed to thread T3.

Thread T3 will receive the value 12, and store it, and then combine the value 12 with its own register value, resulting in 12+8=20. This value 20 is then used as the "register" input argument to a single merged atomic add to be performed for the thread group.

The atomic add is performed, resulting in M being set to 21+20=41. The result of the atomic (i.e. the old value in the memory location M), 21, is then sent to the four threads, and each thread then performs the arithmetic operation (in this case an integer add) using this value and the value it stored prior to the merged atomic operation.

Thus, T0 adds 21 to the value it stored earlier, resulting in 21+0=21, T1 adds 21 to the value it stored earlier, resulting in 21+2=23, T2 adds 21 to the value it stored earlier, resulting in 21+6=27, and T3 adds 21 to the value it stored earlier, resulting in 21+12=33.

The above operation is implemented in the present embodiments by the compiler for the graphics processing pipeline including appropriate instructions in the instruction stream for the shader of the pipeline in question. These instructions are a preprocessing instruction and a "modified" thread group-atomic instruction.

The preprocessing instruction works as follows.

For an atomic operation, it receives as input argument the memory address and the register input value. It then compares the memory address across the various threads in the thread group. The comparison result is then used to pick a set S of threads in the thread group that all received (use) the same memory address for the atomic operation. This set of threads may compare the entire thread group, or it may be as small as one thread, or anything in-between: the only requirement is that all the members of the thread set S are active threads with the same memory address input.

For each thread identified in the set S, a prefix calculation as described above is performed. For this, as discussed above, each of the threads stores a value. This is implemented as an output argument from the preprocessing instruction.

For each active thread in the thread group not in the set S, the arithmetic operation's "identity value" is correspondingly stored (this allows these threads to perform the atomic operation appropriately).

The last thread in the set S will output a combined argument value V as the result of its prefix calculation. This value, together with a bitmap B indicating the threads in the set S, is stored as a second output argument of the preprocessing instruction.

The modified atomic instruction works as follows.

It receives as input arguments the memory address and the register input value, and the combined argument V and bitmap B values computed from the preprocessing instruction. It then uses the bitmap B to identify the threads in the set S, and issues one atomic memory operation for the set of threads S combined, and one atomic memory operation for each active thread in the thread group that is not a member of the set S.

When the atomic operation for the set S returns a result (i.e. the value in the memory location), that result is distributed to all threads that are members of the set S.

When the other atomic operations (the ones for threads that were not members of the set S) are performed, the respective results are returned to each individual thread, as appropriate.

After these two instructions have been executed, each active thread in the thread group will have two values: the first one being the value that was stored in the prefix calculation of the preprocessing instruction, and the second one being the atomic operation result value returned by the atomic memory operation of the modified thread group atomic instruction. These two values are then combined by executing an arithmetic instruction that corresponds to the arithmetic operation for the atomic operation, to give the desired result for the atomic operation for each individual thread in the thread group. This sequence thus provides the correct atomic-semantics for the thread group as a whole.

The implementation described above provides support for the "Return" variant of atomics operation.

For a "NoReturn" variant similar instructions are used, but for the preprocessing instruction, the storing of the preceding thread's result value and the identity values for later use are skipped, as is the returning of the results of the atomic memory operations to the threads, and the subsequent arithmetic instruction that corresponds to the arithmetic operation for the atomic operation.

The compiler can, e.g., determine whether the atomic being executed is a Return or NoReturn type, and include the appropriate instructions in the instruction stream for the execution unit (shader) accordingly.

FIGS. 3 to 9 illustrate various embodiments of the above operation.

FIG. 3 illustrates, for comparison purposes, the conventional processing of an atomic operation (which in this case is an atomic ADD operation), for a thread group consisting of four threads, A, B, C and D. As shown in FIG. 3, each thread has a corresponding pair of registers R0, R1 40 assigned to it and there are two memory addresses 41, A0 and A1, storing the values to be used for the atomic add operation (in this case 100 and 200, respectively).

The atomic ADD instruction 42 is then executed for each thread in the group. As shown in FIG. 3, the atomic ADD instruction in respect of thread A indicates that the value in the memory address A0 should be incremented by one, with the value in the memory address A0 being written to the register R0 for the thread A. Correspondingly, for the thread B, the atomic ADD operation is to increment the value in the memory address A1 by two (+2) and to store the value in the memory address A1 in the register R0 associated with the thread B. For the thread C, the atomic ADD operation is to add five (+5) to the value in the memory address A0, and store that current memory value in the register R0 associated with the thread C. For the thread D, the atomic addition operation is to add three (+3) to the current value stored in the memory address A0 and store the current value in the memory address A0 in the register R0 associated with the thread D.

As shown in FIG. 3, to execute these instructions, an atomic memory access request 43 is sent for each respective thread in the thread group.

Following this operation, the values stored in the memory address A0 will, as shown in FIG. 3, be 109 (corresponding to the original value 100, +1 for the thread A, +5 for the thread C and +3 for the thread D), and the value stored in the memory address A1 will be 202, corresponding to the original value 200 in that memory address +2 for the thread B.

Correspondingly, the R0 registers for each respective thread A, B, C, D, will store the values 100, 200, 101 and 106, respectively.

Thus the final state of the registers 44 and the memory addresses 45 will be as shown in FIG. 3. It can be seen that in this process four separate atomic memory access requests 43 are issued, one for each thread in the thread group.

Figure 4A:
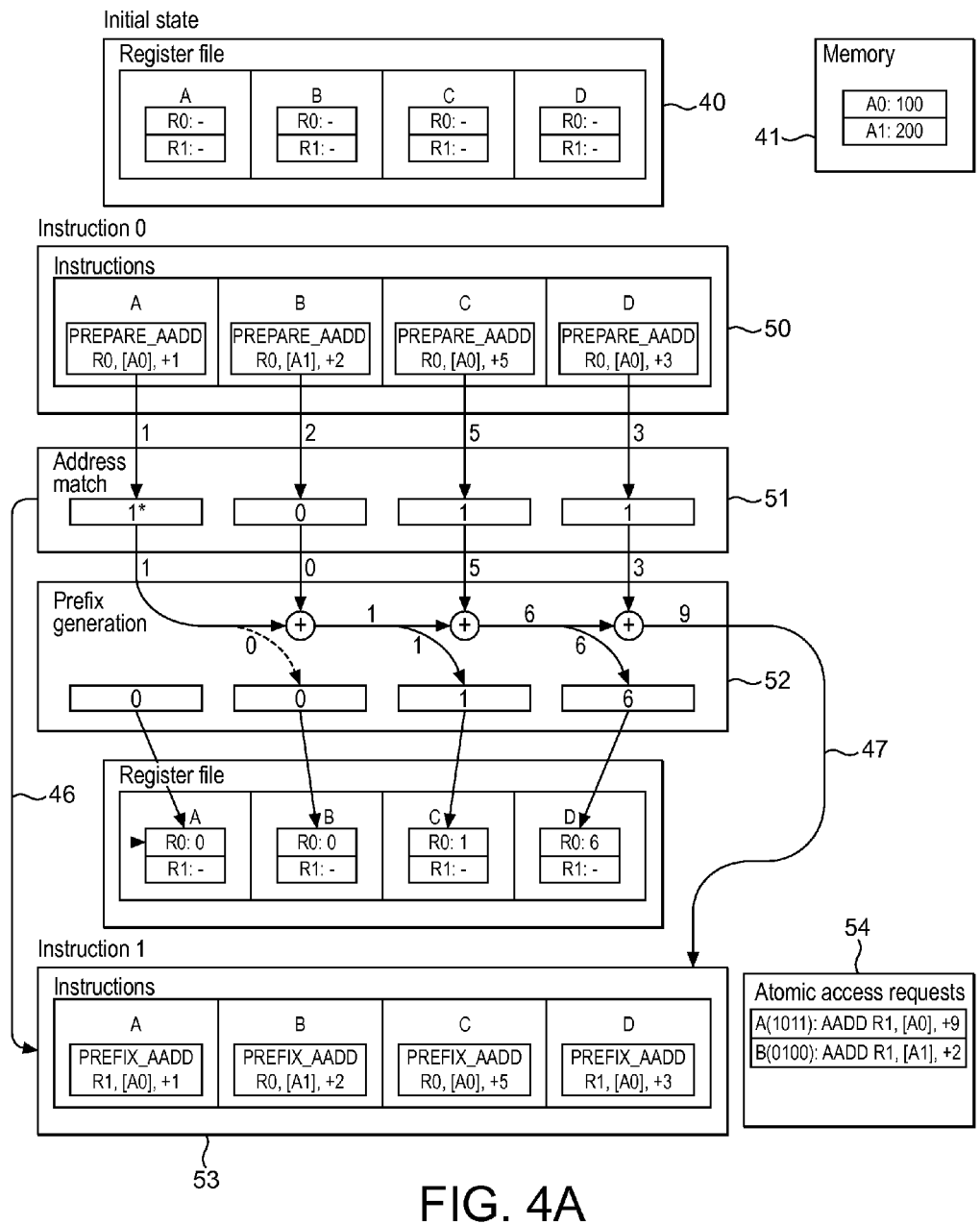
FIG. 4A shows an atomic addition operation.
Figure 4B:
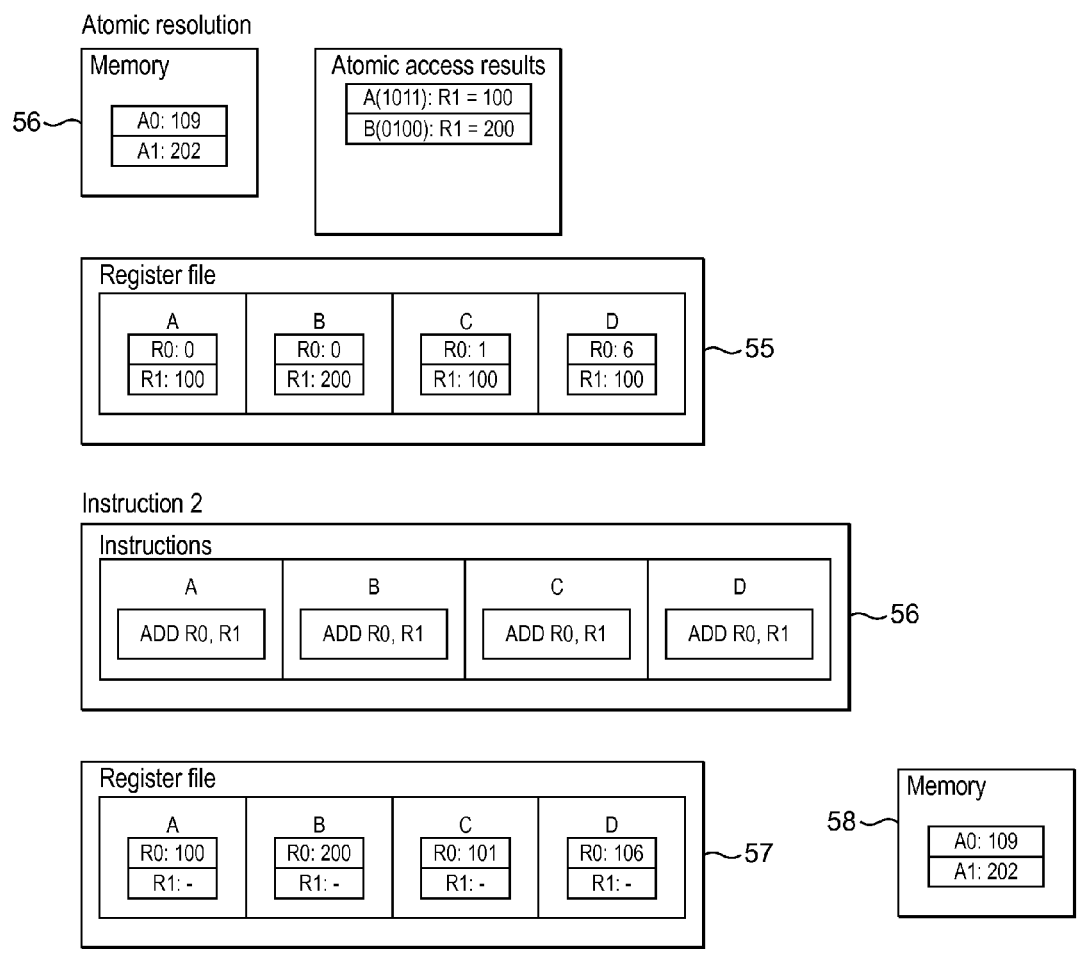
FIG. 4B shows an atomic addition operation.

FIGS. 4A and 4B shows the corresponding atomic addition operations for the threads A, B, C, D, but when performed in accordance with a first embodiment of the technology described herein.

In this case, as shown in FIG. 4A, the initial state of the register file 40 and memory 41 is the same as for the conventional atomic addition operation arrangement.

However, as shown in FIG. 4A, rather than simply issuing and executing the atomic addition operation for each thread in the thread group separately, instead a "prepare atomic addition" (PREPARE_AADD) preprocessing instruction 50 is executed for each thread.

This causes the execution unit to first identify which threads in the thread group wish to access the same address in memory 51 (and thus in this case identifies the threads A, C and D as all accessing the memory address A0), and then prepare an address bitmap (in this case having the form 1011) to indicate which threads in the thread group wish to access the same location in memory.

As well as identifying which threads wish to access the same memory address, this prepare instruction also triggers a prefix operation 52 to store the identity value for the addition operation (which is "0") in the register file for the first thread in the set of threads A, C and D that share the same memory address (thus the thread A in this case), and to then perform the arithmetic ADD operation using that identity value for the first thread in the set (thread A) and provide the result to the next thread in the subset of the threads (so thus the increment value +1 from the atomic addition operation for the thread A is provided to the thread C). The next thread in the set (thread C) then stores that incremental value in its register R0, and performs its increment atomic addition operation on that value, to thereby pass an accumulated increment value of 6 to the final thread D in the set of threads that share the same memory address. The thread D then again stores the accumulated increment value it receives from the thread C in its register R0, and performs its atomic addition operation using that value to generate an accumulated (combined) increment value 9 for the set of threads sharing the memory address as a whole.

The address comparison bitmap (1011) and the accumulated (combined) increment value (9) are then stored as sideband signals 46, 49 for the use of the next instruction (this will be discussed further below).

Thread B, not being part of the set of threads that access the same memory location, stores the identity value 0 in its register R0, as shown in FIG. 4A.

Figure 5:
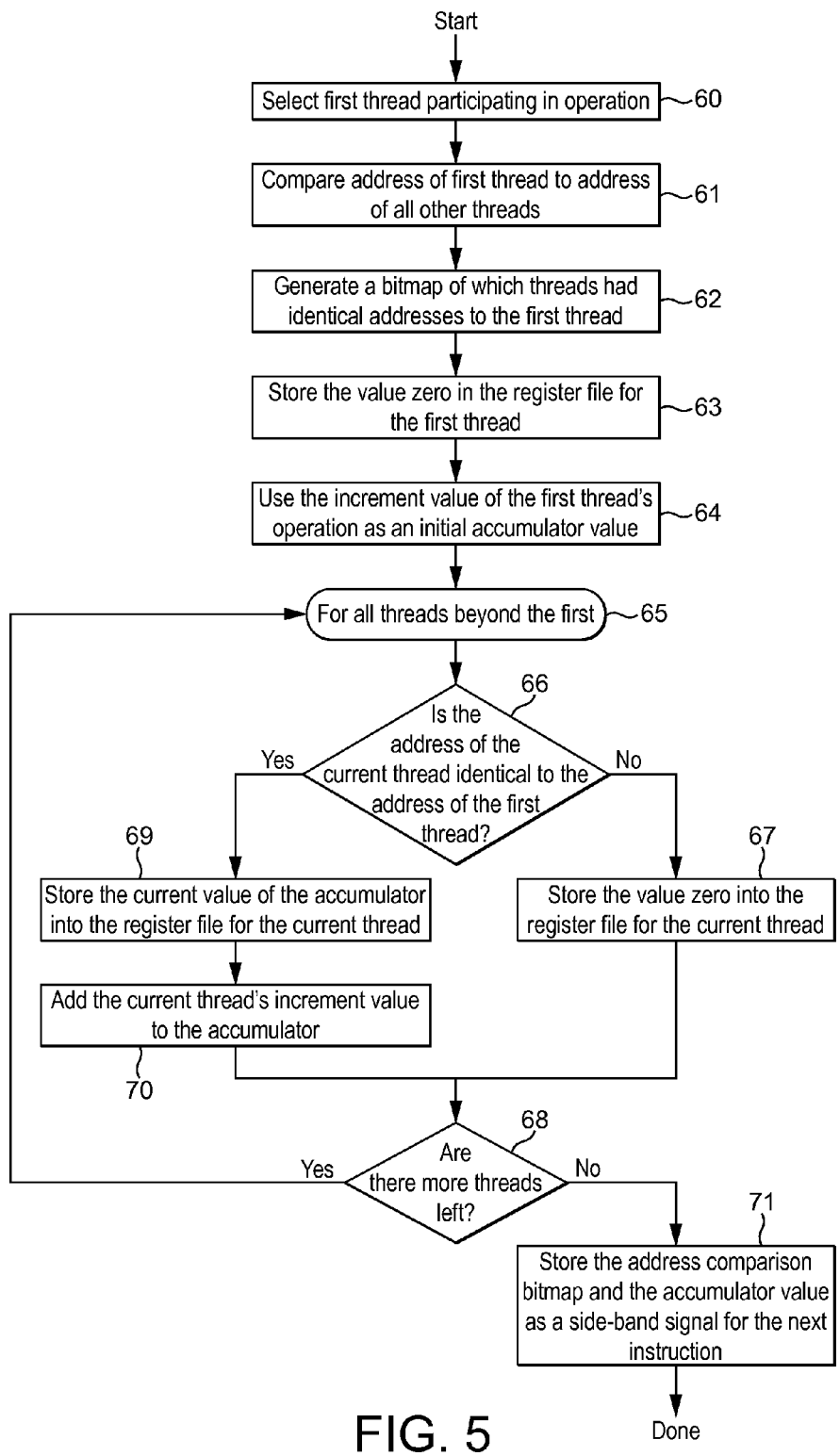
FIG. 5 is a flow chart showing the operation of the PREPARE_AADD instruction.

FIG. 5 is a flowchart showing the operation of the PREPARE_AADD instruction.

As shown in FIG. 5, the first thread participating in the atomic operation is identified (step 60), the address of that first thread is then compared to the address of all the other threads in the thread group for the atomic operation (step 61), and a bitmap of which threads have identical addresses to the first thread is generated (step 62).

The identity value (in this case the value 0) is then stored in the register file for the first thread (step 63) and the increment value of the first thread's operation is used as an initial accumulator value (step 64). Then, for all threads beyond the first (step 65), it is determined if the address of the current thread is identical to the address of the first thread (step 66). If not, the identity value (in this case the value 0) is stored into the register file for the current thread (step 67) and the process then moves on to the next thread (step 68).

On the other hand, if the address of the current thread is found to be identical to the address of the first thread, then the current value of the accumulator is stored into the register file for the current thread (step 69) and the current thread's increment value is added to the accumulated value (step 70). The process then moves on to the next thread (step 68). Once all the threads in the thread group have been processed in this way, then the address comparison bitmap and the incremented accumulator value are stored as a sideband signal for the next instruction (step 71).

Once the prepare atomic addition instruction has been executed for each thread in the thread group, the next instruction, a prefix atomic addition (PREFIX_AADD) instruction 53 is executed for the threads in the thread group. This instruction triggers the sending of corresponding atomic memory access requests 54, one for the set of threads A, C, D sharing the same memory location (as indicated by the address match bitmap), and one for the other thread (thread B). The atomic memory access requests also include the relevant increment value for the atomic memory access request as shown in FIG. 4A (so the atomic memory access request for the "merged" atomic operation includes the relevant accumulated (combined) increment value for the shared atomic memory access request (+9 in this case) as shown in FIG. 4A).

The results of the atomic memory access requests (i.e. the value currently stored in the indicated memory address) are written to the registers R1 for each respective thread 55 as shown in FIG. 4B (thus, for the "merged" atomic operation, the result of atomic memory access request is written to a register file for each thread indicated by the bitmap for the atomic memory access request), and the corresponding values written to the memory addresses 56 are the original value in the memory address incremented by the indicated increment values in the atomic memory access requests (thus 109 for the memory address A0 and 202 for the memory address A1).

Figure 6:
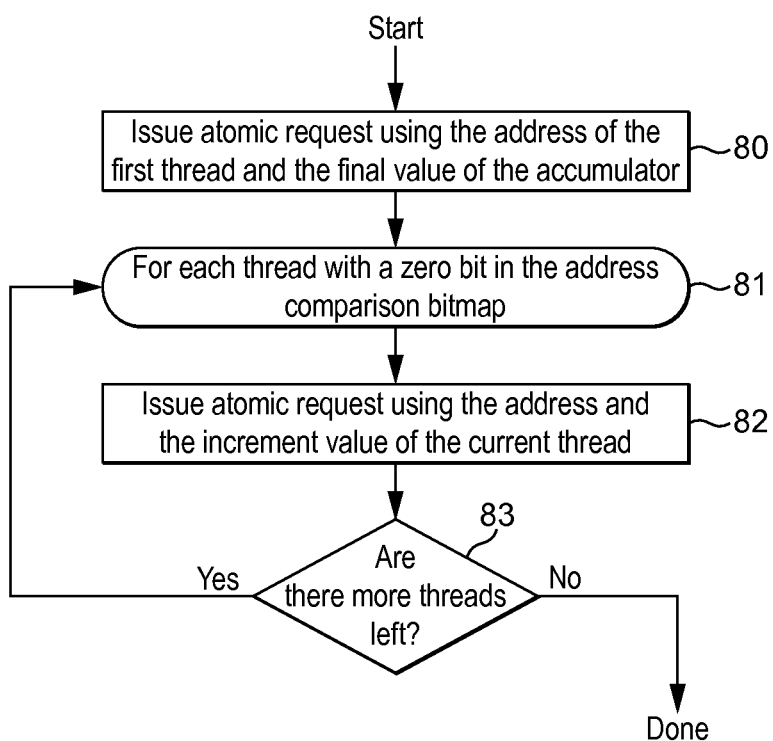
FIG. 6 is a flow chart illustrating the operation PREFIX_AADD atomic addition instruction.

FIG. 6 is a flowchart illustrating the operation PREFIX_AADD atomic addition instruction. As shown in FIG. 6, for the respective set of threads that have been identified as using the same memory location, a single atomic memory request using the address of the first thread and the final value of the accumulator (the accumulated (combined) increment value) is issued (step 80). Then for each thread with a 0 bit in the address comparison bitmap (i.e. for each thread that is not part of the set of identified threads sharing the same memory address) (step 81) a separate atomic memory request is issued using the address and the increment value of the respective thread (step 82). This is continued until all the threads have been processed (step 83).

As shown in FIG. 4B, following the PREFIX_AADD instruction operation, the final values for the atomic operation for each individual thread can be generated by using normal ADD operations 56 to add the two register values for each thread. This then provides the appropriate results in the register file 57 for each thread and at the appropriate memory addresses 58, as shown in FIG. 4B.

It can be seen from the operation illustrated in FIGS. 4A and 4B, that a single "merged" atomic memory access request is issued for all threads in the thread group that are to use the same memory address for their atomic operation as the first thread in the thread group. In this way, a reduced number of atomic memory access requests is required to perform the atomic operation for the thread group, as compared to the conventional arrangement shown in FIG. 3.

Figure 7A:
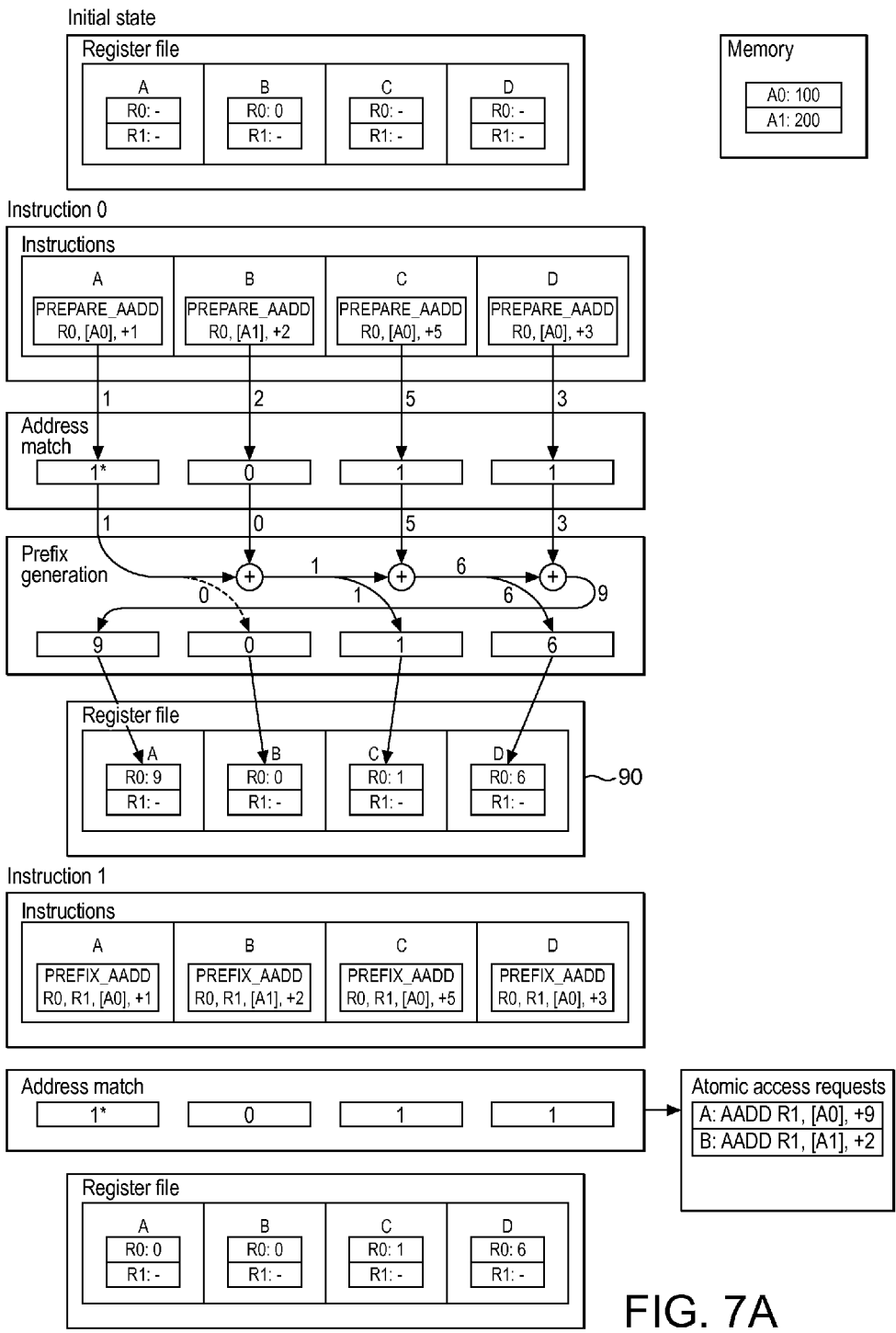
FIG. 7A shows an alternative embodiment to the operation depicted in FIGS. 4A and 4B.

FIGS. 7A and 7B show an alternative embodiment to the operation shown in FIGS. 4A and 4B. In this arrangement, the operation is basically similar to that shown in FIGS. 4A and 4B, but instead of providing the address bitmap as a sideband signal, it is, as shown in FIGS. 7A and 7B, regenerated for each of the instructions that are executed. To facilitate this, as shown in FIG. 7A, each instruction also carries the relevant memory address to be used for the thread, so that the address match bitmap can be regenerated for each instruction.

Also, the final accumulated increment value (9 in this example) is stored in the register file 90 for the first thread A, rather than being provided as a sideband signal.

These features avoid the need for any sideband signals to convey the address match bitmap and the accumulated increment value.

Furthermore, the result of the atomic memory access request is only written to the register file 91 of the first thread in the set of threads that have been identified as sharing a common memory address (thus the thread A in this example). Then, as shown in FIG. 7B, to perform the final addition operation to generate the appropriate values for each individual thread, an instruction 92 that picks one operand from the first thread in the set of threads that share a memory location (thread A in this example) together with the other operand from the register file of the thread in question is used to perform the final additions. Thus, for example, as shown in FIG. 7B, for the thread C, the final atomic addition operation will add the value from register R1 for thread A to the value in register R0 for the thread C, and store the result in register R0 for C to generate the correct atomic operation result.

Figure 8A:
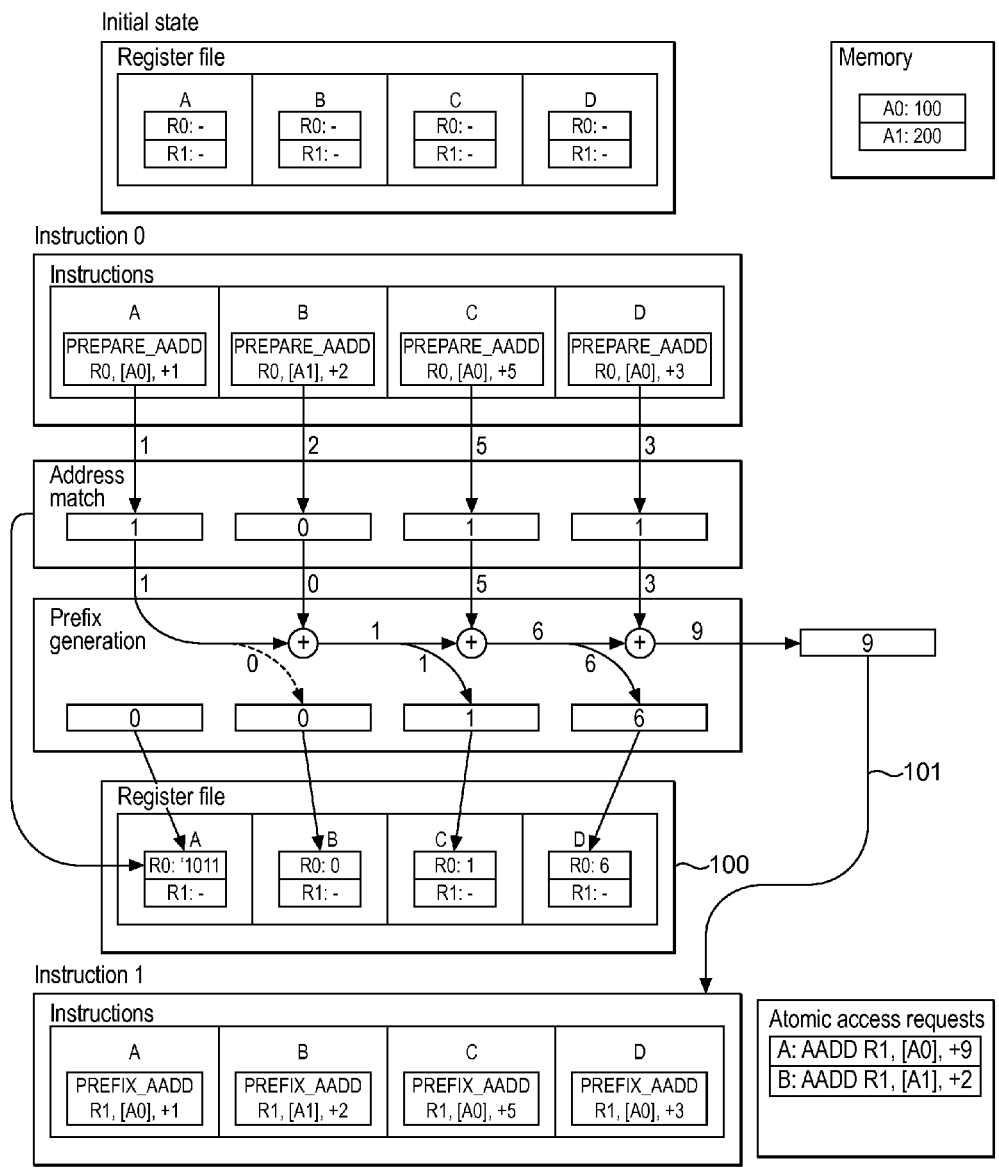
FIG. 8A shows an alternative embodiment to the operation depicted in FIGS. 4A and 4B.
Figure 8B:
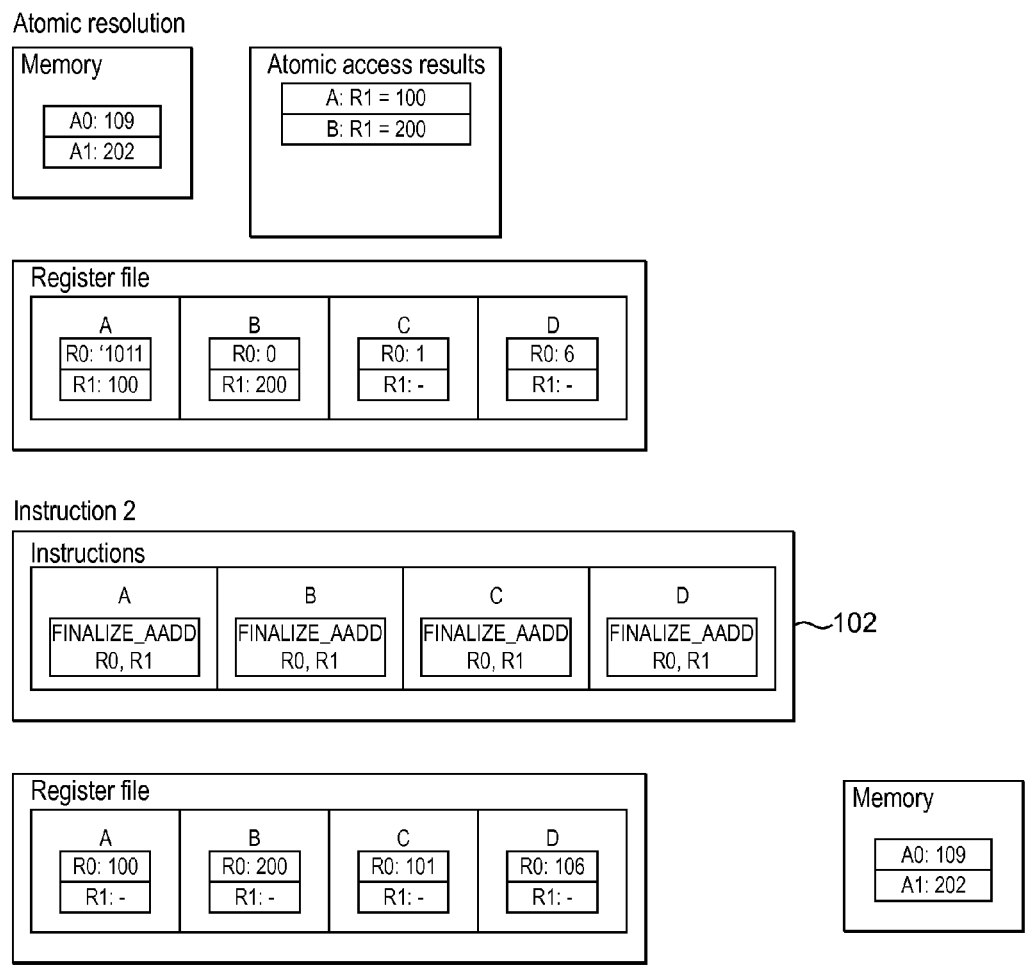
FIG. 8B shows an alternative embodiment to the operation depicted in FIGS. 4A and 4B.

FIGS. 8A and 8B show another embodiment of the technology described herein, again corresponding to the operation shown in FIGS. 4A and 4B. In this arrangement, the address match bitmap is stored, as shown in FIG. 8A, in the register file 100 for the first thread (thread A) and the final accumulated increment value (the value 9) is passed in a sideband signal 101. Like in the arrangement shown in FIGS. 7A and 7B, the result of the atomic memory access request for the set of threads that use the same memory location is only written to a register file for the first thread in that set of threads.

Then, as shown in FIG. 8B, when performing the final addition operation 102, each thread in the set of threads that use the same memory address pick the address match bitmap and one operand from the first thread (thread A), and the other operand from the current thread.

Figure 9A:
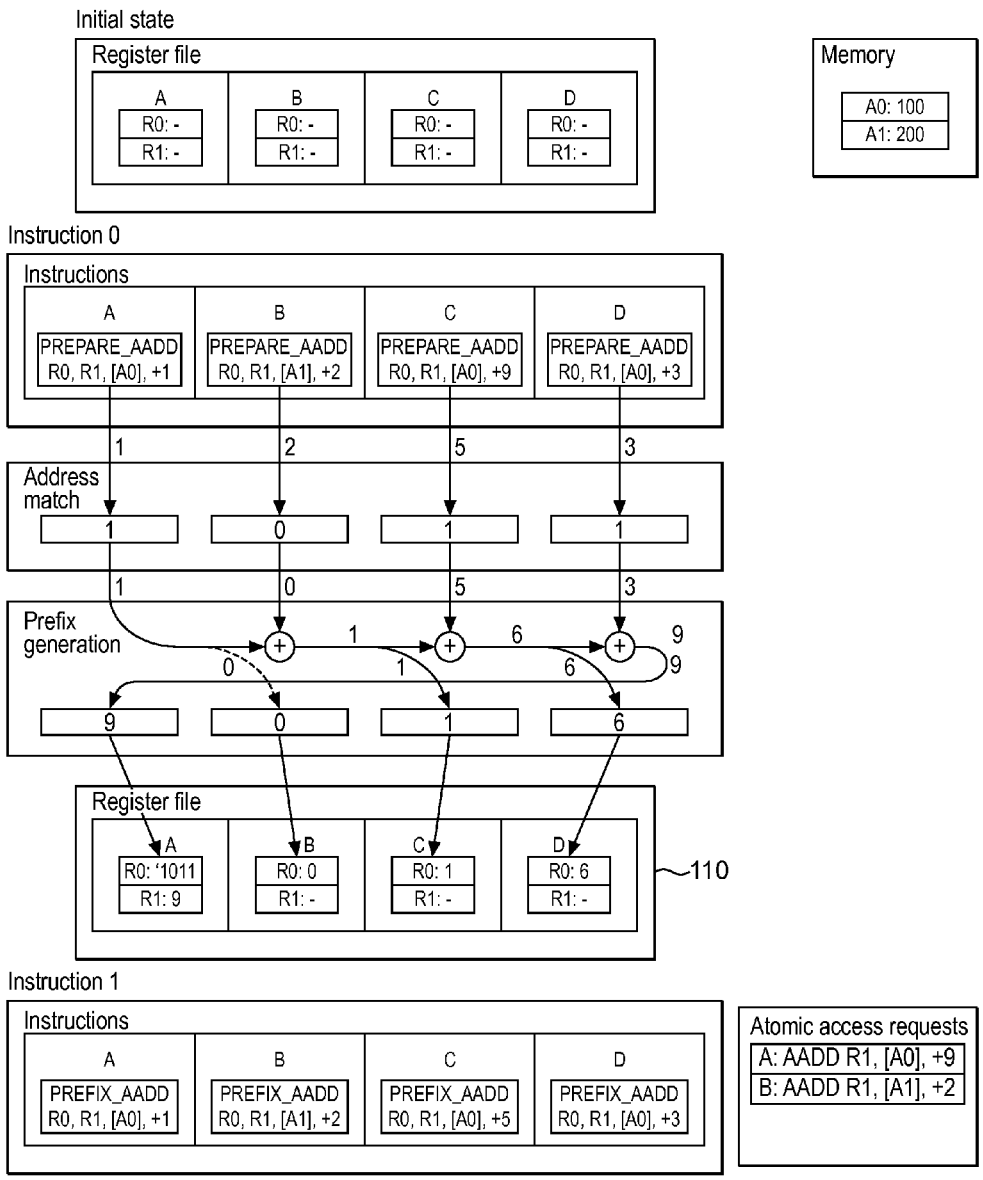
FIG. 9A shows an alternative embodiment to the operation depicted in FIGS. 4A and 4B.

FIGS. 9A and 9B show a further embodiment of the operation of the technology described herein, again corresponding to the arrangement shown in FIGS. 4A and 4B. In this case both the address match bitmap and the final accumulated increment value are stored, as shown in FIG. 9A, in the register file 110 for the first thread in the set of threads that use the same memory address (thread A). In this case, all three instructions require two register operands (together with the memory address and an increment value, as needed).

Like in the arrangement shown in FIGS. 8A and 8B, the result of the atomic memory access request is only written to the first thread of the set of threads that use a common memory address, and the final atomic ADD instruction uses the address match bitmap and one operand from the first thread within the set of threads that use the common memory address, and the other operand from the thread in question.

The above embodiments show operation for the "return" variant of the atomic operation. As discussed above, a "no return" variant of these embodiments would be implemented by skipping the storing of the intermediate values for each thread in the PREPARE_AADD operation, by not storing the result of memory atomic access request for the threads, and by not executing the final atomic addition operation to generate the individual values for each thread (although for the arrangements shown in FIGS. 8 and 9, the address match bitmap will still need to be stored for use by the later instructions).

Also, where a set of plural threads that use the same memory location cannot be identified (i.e. all the threads in the thread group have different addresses), then the atomic operation is performed individually for each thread in the thread group, e.g. using the process shown in FIG. 3.

Also, although the above embodiments have been described with reference to an atomic addition operation, the above arrangements can correspondingly be used with other atomic operations that, for example, are at least approximately commutative and associative and have an identifiable identity value. Thus, other atomic operations may be implemented as appropriate variants of these instructions.

Examples of atomic operations that the present embodiments can be applied to (and their corresponding identity values, V) are:

Integer Add: V=0

Bitwise OR, Bitwise XOR: V=0

Bitwise AND: V=an all-1s bitvector

Minimum Value: V=the largest representable number in the memory value's format

Maximum Value: V=the smallest representable number in the memory value's format

Saturating unsigned integer add: V=0

Integer multiply: V=1

Floating-point add: V=−0.0

Floating-point multiply: V=1.0

Integer add, modulo a constant K: V=0 (A variant of this operation can occur in some GPUs, in the form of an atomic increment/decrement instruction where the "register" input is constant 1, and the value K is provided as an actual argument).

The embodiment can also be used for Swap and Compare-and-Swap atomic operations. For example, for a Swap atomic operation, there will be no need for a final post-addition step, the combining of the atomic register arguments could be done by simply shifting the values to the right for each thread in the set of threads that use the same memory location, and the memory value (the result of the atomic access request) written into the register file for the first thread in the set. A Compare-and-Swap atomic could be performed with corresponding appropriate modifications to the above process.

Various alternatives and additions to the above embodiments would be possible, if desired.

For example, instead of the first thread (and the threads not in the set of threads that access the same memory address) performing the arithmetic operation using the identity value to pass on and/or return its register value, any equivalent operation or process, such as a move instruction, that can achieve that (as discussed above) could be used instead, if desired. In this case, it would not or may not be necessary for these threads to store the identity value for the arithmetic operation. The metadata indicating the threads in the set could, e.g., be used to identify the thread or threads for which this operation needs to be performed.

The prefix operation described above is a serial operation. Where the operations supported are associative, it would be possible to perform a "parallel prefix operation" instead of the serial prefix operation described. This can cut latency considerably, especially for large thread group sizes. Examples of well-known parallel prefix approaches that could be used to cut latency from O(n) to O(log n) include the "Brent-Kung" and the "Kogge-Stone" parallel prefix networks.

It would also be possible to, instead of just identifying a single set S of threads that use the same memory location, to identify two or more such sets: S1, S2, S3 . . . . In this case, the prefix operation must be carried out for each set separately, and one atomic operation is issued for each of the sets.

In the above embodiments, the memory address for each thread is compared to that of the first thread in the thread group to form the set of threads that are processed using the merged atomic. Other arrangements for this would be possible.

For example, a comparison between every possible pair of threads, resulting in N*(N−1)/2 comparators for an N-wide thread group could be done, and the comparison results then used to identify the largest equivalence class in the thread group to use as the set S.

Alternatively, two sets S1 and S2 could be constructed from a thread group of size N, with the set S1 being formed from thread 0 and all threads that have the same address as thread 0, and the set S2 being formed from thread (N−1) and all threads that have the same address as thread (N−1). (If thread 0 and thread N−1 have the same address, then set S2 could be omitted).

It can be seen from the above that the technology described herein, in its embodiments at least, comprises a mechanism for facilitating the execution of atomic operations for thread groups in, e.g., a thread-group based GPU shader core, in a more efficient manner.

This is achieved, in embodiments of the technology described herein at least, by using a single "merged" atomic memory access for the threads in a thread group that are to access the same memory location.

The foregoing detailed description has been presented for the purposes of illustration and description. It is not intended to be exhaustive or to limit the technology to the precise form disclosed. Many modifications and variations are possible in the light of the above teaching. The described embodiments were chosen in order to best explain the principles of the technology and its practical application, to thereby enable others skilled in the art to best utilise the technology in various embodiments and with various modifications as are suited to the particular use contemplated. It is intended that the scope be defined by the claims appended hereto.

What is claimed is:

1. A method of operating a data processing system which includes an execution pipeline that includes one or more programmable execution stages which execute instructions to perform data processing operations, and in which execution threads may be grouped together into thread groups in which the threads of the group are executed in lockstep, one instruction at a time, the method comprising:

for an atomic operation to be executed for a thread group by an execution stage of the execution pipeline, the atomic operation having an associated arithmetic operation:

issuing to the execution stage an instruction or instructions to determine whether there is a set of threads in the thread group for which the atomic operation for the threads accesses the same memory location; and to, if such a set of threads is identified, perform the atomic operation for the set of threads by:

providing to the second thread in the set of threads, the first thread's register value for the atomic operation, performing for the second thread in the set of threads the arithmetic operation for the atomic operation using the second thread's register value for the atomic operation and the first thread's register value for the atomic operation, and performing for each thread in the set of threads other than the first and second threads, if any, the arithmetic operation for the atomic operation using the thread's register value for the atomic operation and the result of the arithmetic operation for the preceding thread in the set of threads, to thereby generate for the final thread in the identified set of threads a combined result of the arithmetic operation for the set of threads; and then executing, for the identified set of threads, a single atomic memory operation to the memory location for the atomic operation for the set of threads using the combined result of the arithmetic operation for the set of threads as its register argument; and the execution stage of the execution pipeline in response to the instructions:

determining whether there is a set of threads in the thread group for which the atomic operation for the threads accesses the same memory location; and, if such a set of threads is identified, performing the atomic operation for the set of threads by:

providing to the second thread in the set of threads, the first thread's register value for the atomic operation;

performing for the second thread in the set of threads the arithmetic operation for the atomic operation using the second thread's register value for the atomic operation and the first thread's register value for the atomic operation; and performing for each thread in the set of threads other than the first and second threads, if any, the arithmetic operation for the atomic operation using the thread's register value for the atomic operation and the result of the arithmetic operation for the preceding thread in the set of threads, to thereby generate for the final thread in the identified set of threads a combined result of the arithmetic operation for the set of threads; and then executing for the identified set of threads a single atomic memory operation to the memory location for the atomic operation for the set of threads using the combined result of the arithmetic operation for the set of threads as its register argument.

2. The method of claim 1, wherein the atomic operation comprises one of:

Integer Add; Bitwise AND, OR, XOR; Minimum Value; Maximum Value; Saturating unsigned integer add; Integer multiply; floating-point add; floating point multiply; integer add, modulo a constant K; Swap; and Compare-and-Swap.

3. The method of claim 1, wherein the step of determining whether there is a set of threads in the thread group for which the atomic operation for the threads accesses the same memory location comprises comparing the memory addresses for the atomic operation across the threads in the thread group to identify a set of threads in the thread group that all use the same memory address.

4. The method of claim 1, further comprising:

where a set of threads for which the atomic operation accesses the same memory location has been identified, generating and storing metadata indicating the threads in the set of threads.

5. The method of claim 1, further comprising the execution stage when performing the atomic operation:

storing for the first thread in the set of threads, the identity value for the arithmetic operation; and storing for each other thread in the set of threads, the arithmetic operation result for the preceding thread in the set of threads.

6. The method of claim 5, further comprising the execution stage when performing the atomic operation:

distributing the result of the single atomic memory access request to all the threads in the set; and performing for each thread in the set, the arithmetic operation for the atomic operation to combine the distributed result value with the identity value or the arithmetic operation result stored for the thread.

7. The method of claim 1, wherein the step of issuing to the execution stage an instruction or instructions to determine whether there is a set of threads in the thread group for which the atomic operation for the threads accesses the same memory location; and to, if such a set of threads is identified, perform the atomic operation comprises issuing:

a pre-processing instruction that causes the execution stage to determine whether there is a set of threads in the thread group that all access the same memory address, and to, if there is, provide to the second thread in the set of threads, the first thread's register value for the atomic operation, perform for the second thread in the set of threads the arithmetic operation for the atomic operation using the second thread's register value for the atomic operation and the first thread's register value for the atomic operation, and perform for each thread in the set of threads other than the first and second threads, if any, the arithmetic operation for the atomic operation using the thread's register value for the atomic operation and the result of the arithmetic operation for the preceding thread in the set of threads, to thereby generate for the final thread in the identified set of threads a combined result of the arithmetic operation for the set of threads;

and a thread group atomic instruction that causes the execution stage to then execute, for the identified set of threads, a single atomic memory operation to the memory location for the atomic operation for the set of threads using the combined result of the arithmetic operation for the set of threads as its register argument.

8. The method of claim 7, wherein:

the pre-processing instruction causes the execution stage also to:

store for the first thread in the set of threads, the identity value for the arithmetic operation; and store for each other thread in the set of threads, the arithmetic operation result for the preceding thread in the set of threads;

and the thread group atomic instruction causes the execution stage also to:

distribute the result of the single atomic memory access request to all the threads in the set.

9. The method of claim 8, further comprising issuing to the execution stage an arithmetic instruction that corresponds to the arithmetic operation for the atomic operation to cause each thread in the set to the arithmetic operation for the atomic operation to combine the result of the single atomic memory access request with the identity value or the arithmetic operation result stored for the thread.

10. The method of claim 7, wherein:

the pre-processing instruction further causes the execution stage to store for each thread in the thread group not in the set, the identity value for the arithmetic operation in question; and the thread group atomic instruction further causes the execution stage to issue an atomic memory operation request for each thread in the thread group that is not in the set.

11. The method of claim 1, wherein the data processing system comprises a graphics processing system that includes a graphics processing pipeline that includes one or more programmable shader stages which execute graphics shader programs to perform graphics processing operations.

12. A data processing system comprising:

an execution pipeline that includes one or more programmable execution stages which execute instructions to perform data processing operations provided to the execution pipeline by the host processor and in which execution threads may be grouped together into thread groups in which the threads of the group are executed in lockstep, one instruction at a time; and a compiler that compiles programs for the execution pipeline to generate instructions for execution stages of the execution pipeline;

wherein the compiler is configured to, for an atomic operation to be executed for a thread group by an execution stage of the execution pipeline, the atomic operation having an associated arithmetic operation:

issue to the execution stage an instruction or instructions to determine whether there is a set of threads in the thread group for which the atomic operation for the threads accesses the same memory location; and to, if such a set of threads is identified, perform the atomic operation for the set of threads by:

providing to the second thread in the set of threads, the first thread's register value for the atomic operation, performing for the second thread in the set of threads the arithmetic operation for the atomic operation using the second thread's register value for the atomic operation and the first thread's register value for the atomic operation, and performing for each thread in the set of threads other than the first and second threads, if any, the arithmetic operation for the atomic operation using the thread's register value for the atomic operation and the result of the arithmetic operation for the preceding thread in the set of threads, to thereby generate for the final thread in the identified set of threads a combined result of the arithmetic operation for the set of threads; and then executing for the identified set of threads a single atomic memory operation to the memory location for the atomic operation for the set of threads using the combined result of the arithmetic operation for the set of threads as its register argument; and and wherein:

at least one execution stage of the execution pipeline is configured to, in response to the instructions:

determine whether there is a set of threads in the thread group for which the atomic operation for the threads accesses the same memory location; and, if such a set of threads is identified:

provide to the second thread in the set of threads, the first thread's register value for the atomic operation;

perform for the second thread in the set of threads the arithmetic operation for the atomic operation using the second thread's register value for the atomic operation and the first thread's register value for the atomic operation; and perform for each thread in the set of threads other than the first and second threads, if any, the arithmetic operation for the atomic operation using the thread's register value for the atomic operation and the result of the arithmetic operation for the preceding thread in the set of threads, to thereby generate for the final thread in the identified set of threads a combined result of the arithmetic operation for the set of threads; and then execute for the identified set of threads a single atomic memory operation to the memory location for the atomic operation for the set of threads using the combined result of the arithmetic operation for the set of threads as its register argument.

13. The system of claim 12, wherein the atomic operation comprises one of: Integer Add; Bitwise AND, OR, XOR; Minimum Value; Maximum Value; Saturating unsigned integer add; Integer multiply; floating-point add; floating point multiply; integer add, modulo a constant K; Swap; and Compare-and-Swap.

14. The system of claim 12, wherein the execution stage compares the memory addresses for the atomic operation across the threads in the thread group to identify a set of threads in the thread group that all use the same memory address.

15. The system of claim 12, wherein the execution stage, where a set of threads for which the atomic operation accesses the same memory location has been identified, generates and stores metadata indicating the threads in the set of threads.

16. The system of claim 12, wherein the execution stage when performing the atomic operation:

stores for the first thread in the set of threads, the identity value for the arithmetic operation; and stores for each other thread in the set of threads, the arithmetic operation result for the preceding thread in the set of threads.

17. The system of claim 16, wherein the execution stage when performing the atomic operation:

distributes the result of the single atomic memory access request to all the threads in the set; and performs for each thread in the set, the arithmetic operation for the atomic operation to combine the distributed result value with the identity value or the arithmetic operation result stored for the thread.

18. The system of claim 12, wherein the compiler issues to the execution stage:

a pre-processing instruction that causes the execution stage to determine whether there is a set of threads in the thread group that all access the same memory address, and to, if there is, provide to the second thread in the set of threads, the first thread's register value for the atomic operation, perform for the second thread in the set of threads the arithmetic operation for the atomic operation using the second thread's register value for the atomic operation and the first thread's register value for the atomic operation, and perform for each thread in the set of threads other than the first and second threads, if any, the arithmetic operation for the atomic operation using the thread's register value for the atomic operation and the result of the arithmetic operation for the preceding thread in the set of threads, to thereby generate for the final thread in the identified set of threads a combined result of the arithmetic operation for the set of threads; and a thread group atomic instruction that causes the execution stage to then execute, for the identified set of threads, a single atomic memory operation to the memory location for the atomic operation for the set of threads using the combined result of the arithmetic operation for the set of threads as its register argument.

19. The system of claim 18, wherein:

the pre-processing instruction causes the execution stage also to:

store for the first thread in the set of threads, the identity value for the arithmetic operation; and store for each other thread in the set of threads, the arithmetic operation result for the preceding thread in the set of threads;

and the thread group atomic instruction causes the execution stage also to:

distribute the result of the single atomic memory access request to all the threads in the set.

20. The system of claim 19, wherein the compiler further issues to the execution stage an arithmetic instruction that corresponds to the arithmetic operation for the atomic operation to cause each thread in the set to the arithmetic operation for the atomic operation to combine the result of the single atomic memory access request with the identity value or the arithmetic operation result stored for the thread.

21. The system of claim 18, wherein:
the pre-processing instruction further causes the execution stage to store for each thread in the thread group not in the set, the identity value for the arithmetic operation in question; and
the thread group atomic instruction further causes the execution stage to issue an atomic memory operation request for each thread in the thread group that is not in the set.

22. The system of claim 12, wherein the data processing system comprises a graphics processing system that includes a graphics processing pipeline that includes one or more programmable shader stages which execute graphics shader programs to perform graphics processing operations.

23. A compiler that compiles programs to generate instructions for execution stages of an execution pipeline that includes one or more programmable execution stages that execute instructions to perform data processing operations, and in which execution threads may be grouped together into thread groups in which the threads of the group are executed in lockstep, one instruction at a time, wherein the compiler is configured to for an atomic operation to be executed for a thread group by an execution stage of the execution pipeline, the atomic operation having an associated arithmetic operation:
issue to the execution stage an instruction or instructions to determine whether there is a set of threads in the thread group for which the atomic operation for the threads accesses the same memory location; and to, if such a set of threads is identified, perform the atomic operation for the set of threads by:
providing to the second thread in the set of threads, the first thread's register value for the atomic operation, performing for the second thread in the set of threads the arithmetic operation for the atomic operation using the second thread's register value for the atomic operation and the first thread's register value for the atomic operation, and performing for each thread in the set of threads other than the first and second threads, if any, the arithmetic operation for the atomic operation using the thread's register value for the atomic operation and the result of the arithmetic operation for the preceding thread in the set of threads, to thereby generate for the final thread in the identified set of threads a combined result of the arithmetic operation for the set of threads; and
then executing, for the identified set of threads, a single atomic memory operation to the memory location for the atomic operation for the set of threads using the combined result of the arithmetic operation for the set of threads as its register argument.

24. An execution pipeline for a data processing system that includes one or more programmable execution stages which execute instructions to perform data processing operations, and in which execution threads may be grouped together into thread groups in which the threads of the group are executed in lockstep, one instruction at a time, wherein:
at least one execution stage of the execution pipeline is configured to, when executing instructions in an instruction stream, in response to a set of instructions in the instruction stream for performing an atomic operation provided by a compiler for the execution stage:
determine whether there is a set of threads in the thread group for which the atomic operation for the threads accesses the same memory location; and, if such a set of threads is identified:
provide to the second thread in the set of threads, the first thread's register value for the atomic operation;
perform for the second thread in the set of threads the arithmetic operation for the atomic operation using the second thread's register value for the atomic operation and the first thread's register value for the atomic operation; and
perform for each thread in the set of threads other than the first and second threads, if any, the arithmetic operation for the atomic operation using the thread's register value for the atomic operation and the result of the arithmetic operation for the preceding thread in the set of threads, to thereby generate for the final thread in the identified set of threads a combined result of the arithmetic operation for the set of threads; and
then execute for the identified set of threads a single atomic memory operation to the memory location for the atomic operation for the set of threads using the combined result of the arithmetic operation for the set of threads as its register argument for the set of threads.

25. A non-transitory computer readable storage medium storing computer software code which when executing on a processor performs a method of operating a data processing system which includes an execution pipeline that includes one or more programmable execution stages which execute instructions to perform data processing operations, and in which execution threads may be grouped together into thread groups in which the threads of the group are executed in lockstep, one instruction at a time, the method comprising:
for an atomic operation to be executed for a thread group by an execution stage of the execution pipeline, the atomic operation having an associated arithmetic operation:
issuing to the execution stage an instruction or instructions to determine whether there is a set of threads in the thread group for which the atomic operation for the threads accesses the same memory location; and to, if such a set of threads is identified, perform the atomic operation for the set of threads by:
providing to the second thread in the set of threads, the first thread's register value for the atomic operation, performing for the second thread in the set of threads the arithmetic operation for the atomic operation using the second thread's register value for the atomic operation and the first thread's register value for the atomic operation, and performing for each thread in the set of threads other than the first and second threads, if any, the arithmetic operation for the atomic operation using the thread's register value for the atomic operation and the result of the arithmetic operation for the preceding thread in the set of threads, to thereby generate for the final thread in the identified set of threads a combined result of the arithmetic operation for the set of threads; and
then executing, for the identified set of threads, a single atomic memory operation to the memory location for the atomic operation for the set of threads using the combined result of the arithmetic operation for the set of threads as its register argument; and
the execution stage of the execution pipeline in response to the instructions:
determining whether there is a set of threads in the thread group for which the atomic operation for the threads accesses the same memory location; and, if such a set of threads is identified, performing the atomic operation for the set of threads by:

providing to the second thread in the set of threads, the first thread's register value for the atomic operation;

performing for the second thread in the set of threads the arithmetic operation for the atomic operation using the second thread's register value for the atomic operation and the first thread's register value for the atomic operation; and performing for each thread in the set of threads other than the first and second threads, if any, the arithmetic operation for the atomic operation using the thread's register value for the atomic operation and the result of the arithmetic operation for the preceding thread in the set of threads, to thereby generate for the final thread in the identified set of threads a combined result of the arithmetic operation for the set of threads; and then executing for the identified set of threads a single atomic memory operation to the memory location for the atomic operation for the set of threads using the combined result of the arithmetic operation for the set of threads as its register argument.

* * * * *

UNITED STATES PATENT AND TRADEMARK OFFICE
CERTIFICATE OF CORRECTION

PATENT NO. : 9,256,466 B2
APPLICATION NO. : 13/913334
DATED : February 9, 2016
INVENTOR(S) : Nystad It is certified that error appears in the above-identified patent and that said Letters Patent is hereby corrected as shown below:

Title page, item (56), Other Publications (line 7): Please change "Implementaing" to
-- Implementing --

In the Claims

Column 29, line 35 (claim 12): Please change "and wherein" to -- wherein --

Signed and Sealed this
Sixteenth Day of August, 2016

Michelle K. Lee
*Director of the United States Patent and Trademark Office*